US012780399B2

(12) United States Patent
Rawdon

(10) Patent No.: US 12,780,399 B2
(45) Date of Patent: Nov. 3, 2026

(54) AIRCRAFT COMPONENT WITH STRUCTURAL FOAM

(71) Applicant: JetZero, Inc., Long Beach, CA (US)

(72) Inventor: Blaine Knight Rawdon, Riverside, CA (US)

(73) Assignee: JetZero, Inc., Long Beach, CA (US)

(*) Notice: Subject to any disclaimer, the term of this patent is extended or adjusted under 35 U.S.C. 154(b) by 76 days.

(21) Appl. No.: 18/955,819

(22) Filed: Nov. 21, 2024

(65) Prior Publication Data

US 2026/0208848 A1 Jul. 23, 2026

Related U.S. Application Data

(63) Continuation of application No. 18/417,424, filed on Jan. 19, 2024, now Pat. No. 12,187,425.

(51) Int. Cl.

| | |
|---|---|
| ***B64C 3/26*** | (2006.01) |
| ***B64C 3/20*** | (2006.01) |
| ***B64C 3/24*** | (2006.01) |

(52) U.S. Cl.
CPC .................. *B64C 3/26* (2013.01); *B64C 3/20* (2013.01); *B64C 3/24* (2013.01)

(58) Field of Classification Search
CPC ................ B64C 3/26; B64C 3/20; B64C 3/24
See application file for complete search history.

(56) References Cited

U.S. PATENT DOCUMENTS

| | | | | |
|---|---|---|---|---|
| 3,873,654 | A | 3/1975 | Smith | |
| 4,811,540 | A | 3/1989 | Kallies et al. | |
| 5,024,399 | A | 6/1991 | Barquet et al. | |
| 8,608,109 | B2 | 12/2013 | Campbell | |
| 9,695,533 | B2 | 7/2017 | Beraud | |
| 10,377,461 | B2 | 8/2019 | Jörn et al. | |
| 11,453,483 | B2 | 9/2022 | Page | |
| 11,613,341 | B2 | 3/2023 | Behzadpour et al. | |
| 12,534,177 | B2 * | 1/2026 | Rawdon | B64C 1/12 |
| 2009/0057487 | A1 * | 3/2009 | Velicki | B64C 1/12 428/221 |
| 2010/0233424 | A1 | 9/2010 | Dan-Jumbo et al. | |
| 2011/0020595 | A1 | 1/2011 | Kolax et al. | |
| 2011/0039057 | A1 | 2/2011 | Frisch et al. | |
| 2013/0099053 | A1 | 4/2013 | Barmichev et al. | |
| 2014/0186588 | A1 | 7/2014 | Victorazzo | |
| 2016/0375978 | A1 | 12/2016 | Joern | |
| 2021/0253246 | A1 | 8/2021 | Tibbitts et al. | |
| 2022/0001974 | A1 | 1/2022 | Page | |
| 2022/0024556 | A1 | 1/2022 | Heaysman et al. | |

(Continued)

FOREIGN PATENT DOCUMENTS

| | | | |
|---|---|---|---|
| DE | 102008057247 | B3 | 1/2010 |
| JP | 2013512798 | A | 4/2013 |

*Primary Examiner* — Rodney A Bonnette

(74) *Attorney, Agent, or Firm* — Jeffrey Schox

(57) ABSTRACT

An aircraft component including a structural foam having a predetermined shape, an outer flange located near a first end of the structural foam, an inner flange located near a second end of the structural foam, a web skin encapsulating the inner flange and at least a portion of the structural foam wherein the structural foam is affixed to the web skin, wherein the aircraft component comprises a portion of a blended wing body aircraft (BWB), the BWB having no demarcation between a wing and a main body of the BWB.

18 Claims, 13 Drawing Sheets

(56) References Cited

U.S. PATENT DOCUMENTS

| | | | |
|---|---|---|---|
| 2022/0033058 | A1 | 2/2022 | Behzadpour et al. |
| 2022/0194025 | A1 | 6/2022 | Kismarton |
| 2023/0143892 | A1 | 5/2023 | Gaitonde et al. |
| 2023/0242254 | A1 | 8/2023 | Page |

* cited by examiner

AIRCRAFT COMPONENT WITH STRUCTURAL FOAM

CROSS-REFERENCE TO RELATED APPLICATIONS

This application is a continuation of Non-provisional application Ser. No. 18/417,424 filed on Jan. 19, 2024, and entitled "AIRCRAFT COMPONENT WITH STRUCTURAL FOAM," the entirety of which is incorporated herein by reference.

FIELD OF THE INVENTION

The present invention generally relates to the field of aircraft structures. In particular, the present invention is directed to an aircraft component with structural foam.

BACKGROUND

Tubular fuselages with semi-monocoque skins may resist pressurization loads in part by hoop tension in the skin panels. The curved form of the skins resists deformation effectively because any deflection must result in a substantial change in the skin's circumferential length which causes strain. Non-tubular fuselages may not have the capability to resist pressure loads through hoop tension in the skin panels.

SUMMARY OF THE DISCLOSURE

In an aspect, an aircraft component is described. Aircraft component includes a core filler having a predetermined shape, an outer flange located near a first end of the core filler, an inner flange located near a second end of the core filler, a web skin encapsulating the inner flange and at least a portion of the core filler wherein the core filler is affixed to the web skin. The aircraft component includes portion of an aircraft.

In another aspect, a method of manufacture of an aircraft component is described. The method includes receiving a component mold having a mold cavity, wherein the mold cavity comprises a web skin substantially blanketing a surface of the mold cavity, an inner flange located and in contact with the web skin and a core filler is situated on top of the inner flange and placing an outer flange within the component mold and on top of the core filler, wherein the outer flange and the web skin encapsulate the inner flange and the core filler.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to aircraft structures. In one or more embodiments, aspects of the present disclosure include a web skin, an outer flange, an inner flange and a structural foam. Aspects of this disclosure can be used to resist pressurization loads on a non-tubular aircraft.

Aspects of the present disclosure can be used to resist pressurization loads in an aircraft or portions of an aircraft that cannot resist pressurization through hoop tension in the shell. Aspects of the present disclosure can be used to transfer pressurization loads from an inner mold line of the aircraft to the frames of the aircraft. Aspects of this disclosure include a structural foam wherein the structural foam may allow for increased structural strength of aircraft component. Structural foam may further prevent the introduction of a resin during a molding process. Exemplary embodiments illustrating aspects of the present disclosure are described below in the context of several specific examples.

Figure 1:
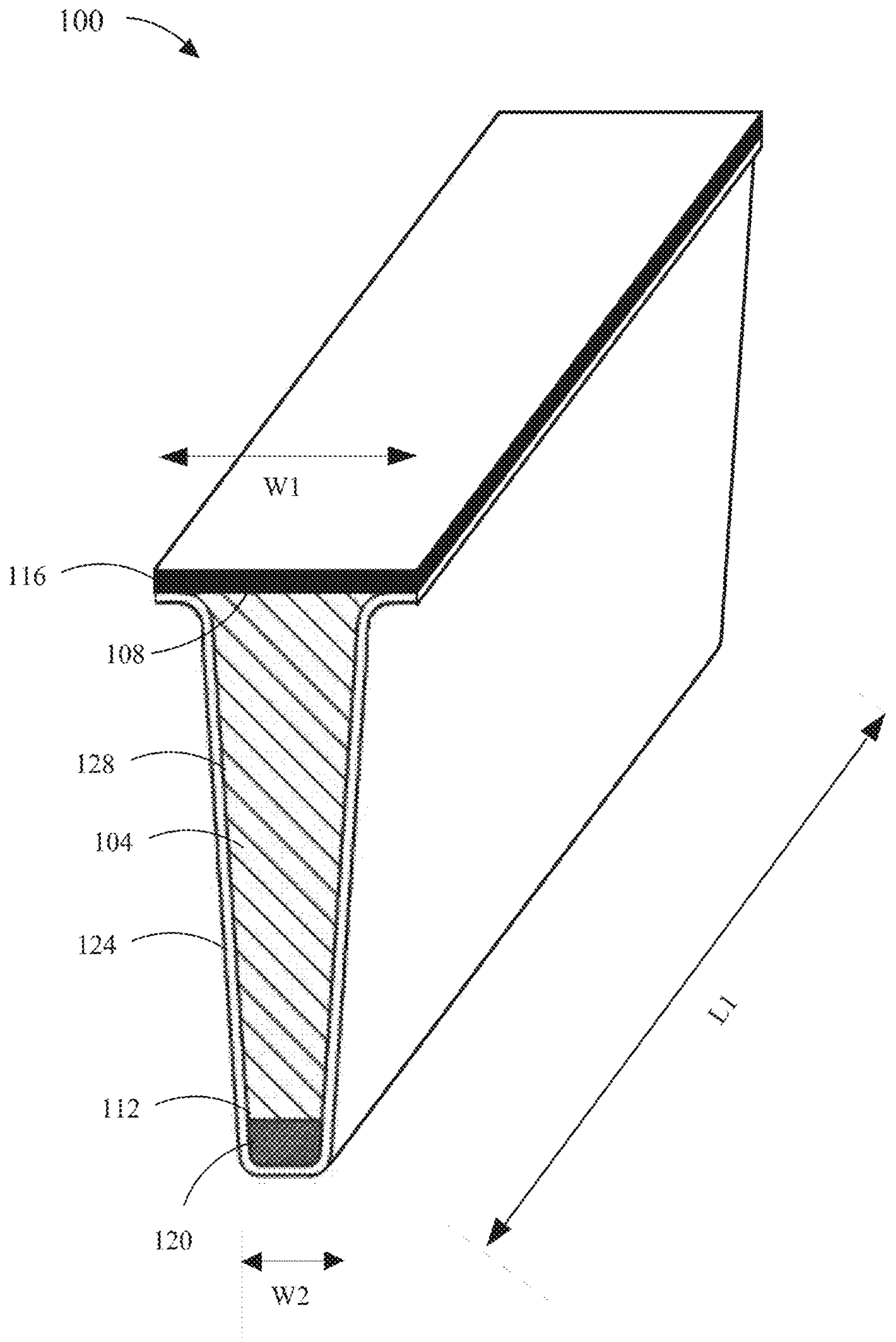
FIG. 1 is an exemplary embodiment of an aircraft component according to the subject disclosure.

Referring to FIG. 1, an exemplary embodiment of an aircraft component 100 is described. In one or more embodiments, aircraft component 100 includes a structural foam 104. "Structural foam" for the purposes of this disclosure is a porous material capable of deformation and reformation. For example, and without limitation, structural foam 104 may include polystyrene foam. In one or more embodiments, structural foam 104 may be consistent with foam core as described in further detail below. In one or more embodiments, structural foam 104 may include a core filler such as any core filler as described in this disclosure. In one or more embodiments, structural foam 104 may include a closed cell foam. "Closed cell foam" for the purposes of this disclosure is a foam having sealed pockets wherein the sealed pockets prevent the passage of air, gases or fluids through the sealed pockets. For example, and without limitation, closed cell foam may prevent the passe of a fluid through the closed cell foam. Closed cell foam may be described in further detail below. In one or more embodiments, structural foam 104 may include a foam having a predetermined shape. A "Predetermined shape" for the purposes of this disclosure refers to a material that has been given a particular shape prior to assembly or manufacturing of a part and retains the particular shape after assembly or manufacturing of the part. For example, and without limitation, structural foam 104 may include a predetermined circular shape wherein a cross section of structural foam 104 may remain circular even after completion of aircraft component 100. In one or more embodiments, a component having a predetermined shape may contain a cross section having a predefined form or outline that may stay consistent throughout a manufacturing process. In one or more embodiments, a component having a predetermined shape may ensure that the component performs its intended functionality. In one or more embodiments, structural foam 104 may provide a shape to aircraft component 100 of a portion thereof wherein predetermined shape of structural foam 104 may facilitate in a desired shape of aircraft component 100. In one or more embodiments, structural foam 104 may have a predetermined shape wherein structural foam 104 may maintain the same shape prior to being placed within aircraft component 100. In one or more embodiments, structural foam 104 may include a predetermined shape wherein components of aircraft components 100 may be given their shapes due to structural foam 104. In one or more embodiments, structural foam 104 may include a predetermined shape wherein structural foam 104 may be deformed and reformed back into the predetermined shape. In one or more embodiments, the predetermined shape of structural foam 104 may include a cylindrical shape, a rectangular shape and/or an oval shape. In one or more embodiments, the predetermined shape of structural foam 104 may be predominantly trapezoidal wherein structural foam 104 may include a small base, a large base, a small base and two legs. In one or more embodiments, structural foam 104 may contain a predominantly trapezoidal shape wherein a cross section of structural foam 104 includes an isosceles trapezoid wherein the two legs of the trapezoid may be equal in length the large base of the trapezoid is larger than the small base of the trapezoid. In one or more embodiments, structural foam 104 may include a predominantly trapezoidal shape wherein structural foam 104 may be symmetric about an axis. In one or more embodiments, structural foam 104 may include a closed cell foam as described in further detail below. In one or more embodiments, structural foam 104 may include a predetermined shape wherein structural foam 104 may provide a shape for other components. In one or more embodiments, structural foam 104 may provide for a predetermined shape during a molding process wherein materials in contact with structural foam 104 may retain their shape during the molding process. In one or more embodiments, structural foam 104 may include a material impermeable to a resin as described in further detail below. In one or more embodiments, structural foam 104 may include a material impermeable to a resin wherein during a molding process, resin may not be transferred to structural foam 104.

With continued reference to FIG. 1, structural foam 104 may include a foam first end 108 and a foam second end 112. In one or more embodiments, structural foam 104 may include a trapezoidal shape wherein foam first end 108 of structural foam 104 may include a large base of the trapezoid and foam second end 112 may include a small base of the trapezoid. In one or more embodiments, a trapezoid or a component with a trapezoidal shape may contain four sides wherein a first side includes a large base, an opposing side includes a small base, and the two remining sides includes the legs of the trapezoid. In one or more embodiments, foam first end 108 may include an opposing end to foam second end 112.

With continued reference to FIG. 1, aircraft component 100 includes an outer flange 116 located near foam first end 108. Outer flange 116 may be consistent with flange and/or outer flange 116 as described in this disclosure. "Flange" for the purposes of this disclosure is a non-pliable material configured to provide rigidity to an aircraft component such as aircraft component 100. In one or more embodiments, outer flange 116 may be located near foam first end 108 wherein outer flange 116 may be in contact with structural foam 104 and/or foam first end 108. In one or more embodiments, outer flange 116 may include a width of W1 and/or a length of L1. In one or more embodiments outer flange 116 may span the length of aircraft component 100 wherein aircraft component 100 and outer flange 116 may contain a substantially similar length. In one or more embodiments, a width W1 of outer flange 116 may be smaller than a length L1 of outer flange 116. In one or more embodiments, outer flange 116 may include a circular beam, a cylindrical beam, a box beam and the like. In one or more embodiments, outer flange 116 may extend the length of aircraft component 100. In one or more embodiments, aircraft component 100 may contain varying widths along aircraft component 100 wherein outer flange 116 may be located in the portion containing the largest width. In one or more embodiments, outer flange 116 may contain a single unified component having uniform length and width. In one or more embodiments, outer flange 116 may include a plurality of components having uniform and/or non-uniform length and width. In one or more embodiments, outer flange 116 may include a single unified component having varying lengths and widths.

With continued reference to FIG. 1, aircraft component 100 may include an inner flange 120 located near foam second end 112, or alternatively a second end of structural foam 104. In one or more embodiments, inner flange 120 may be consistent with flange as described in this disclosure. In one or more embodiments, Inner flange 120 may contain a Length L1 similar to that of outer flange 116. In one or more embodiments, inner flange 120 may contain a width W2. In one or more embodiments, inner flange 120 may contain a width W2 smaller than that of outer flange 116. In one or more embodiments, inner flange 120 may include a cylindrical cord made of carbon fiber material, aluminum, aluminum alloy and/or any other metals wherein the cylindrical cord may extend a length of L1. In one or more embodiments, the cylindrical cord may contain a radius of W2 and a length of L1. In one or more embodiments, inner flange 120 may be located at foam second end 112 wherein inner flange 120 may be located on a small base of the trapezoidal shape. In one or more embodiments, inner flange 120 may include a trapezoidal shape wherein a large base of inner flange 120 may contain the same width as the small base of structural foam 104. In one or more embodiments, the combination of structural foam 104 and inner flange 120 may include a predominantly trapezoidal shape. In one or more embodiments, outer flange 116 and inner flange 120 may be positioned in a plurality of ways relative to one another. For example, and without limitation, outer flange may be situated lower than inner flange 116 with respect to its placement on an aircraft. Continuing on a lower surface of BWB aircraft, outer flange 116 may be located beneath inner flange 120 with respect to the BWB aircraft. In another non limiting example, on a BWB centerbody, on the upper OML, lower OML, curved leading edges, side pressure bulkheads at the cabin sides, and aft pressure bulkheads at the cabin aft boundary, the structures orientation may vary such that outer flange 116 and inner flange 120 may be situated above, beneath, and/or parallel to one another with respect to the aircraft. In addition, the shape, size, curvature and/or form of outer flange 116 and inner flange 120 may vary based on its location on the BWB center body. For example, and without limitation, outer flange 116 may contain a differing size, thickness, shape and the like depending on its location on the BWB aircraft.

With continued reference to FIG. 1, a flange such as outer flange 120, inner flange 120 and/or any other flange as described in this disclosure may include a metal such as aluminum or aluminum alloy. In one or more embodiments, flange may include carbon fiber material, such as any carbon fiber material as described in this disclosure. In one or more embodiments, flange may include a thick material wherein the thick material may have enough rigidity in each flange that the flanges are stable in terms of crippling or buckling to the side.

With continued reference to FIG. 1 aircraft component 100 may include a web skin 124. Web skin 124 may be consistent with any web skin 124 as described in this disclosure. In one or more embodiments, web skin 124 may include a molded part wherein the molded part includes a carbon fiber material, and a resin as described in further detail below. In one or more embodiments, web skin 124 may include a carbon fiber material such as any carbon fiber material as described in this disclosure. In one or more embodiments, web skin 124 may include a carbon fiber material that has been molded during a molding process. In one or more embodiments, during a molding process, resin may be introduced into carbon fiber material wherein the resin may be configured to provide the carbon fiber material with a fixed shape. In one or more embodiments, web skin 124 may include a molded part that has been formed within a mold. In one or more embodiments, web skin 124 may include a molded part that has been provided a shape as a result of structural foam 104. In one or more embodiments, structural foam 104 may provide a shape to web skin 124 during a molding process as described in further detail below. In one or more embodiments, web skin 124 may wrap around structural foam 104 or a portion thereof wherein web skin 124 may be provided a shape similar to that of structural foam 104. In one or more embodiments, a web skin 124 may encapsulate inner flange 120 and at least a portion of the structural foam 104. In one or more embodiments, web skin 124 may encapsulate inner flange 120 wherein inner flange 120 may be located within web skin 124 and/or within a hollow cavity created by web skin 124. In one or more embodiments, web skin 124 may include a sheet that has been pressed and/or molded into a provided shape. In one or more embodiments, the provided shape may include a cylinder, a rectangular cylinder and/or any other shape that may provide for a hollow cavity. In one or more embodiments, inner flange 120 may be encapsulated by web skin 124 such that it is located within the hollow cavity. In one or more embodiments, inner flange 120 may be encapsulated by web skin 124 such that inner flange 120 may be located within a boundary created by one or more surface of web skin 124. In one or more embodiments, web skin 124 may be non-planar such that one or more surface may be located on a differing plane. In one or more embodiments, web skin 124 may be nonplanar wherein inner flange 120 may be situated within a boundary created by web skin 124. In one or more embodiments, web skin 124 may include an arch wherein web skin 124 may include a circular and/or predominantly or substantially circular surface. In one or more embodiments, web skin 124 may be predominantly triangular in shape. In one or more embodiments, web skin 124 may include a predominantly or substantially trapezoidal shape wherein a first portion of web skin 124 may include a small base of the trapezoid, the second portion may include a first leg of the trapezoid, and the third portion may include a third leg of the trapezoid. In one or more embodiments, a component may be described as having a predominantly specific shape or a substantially specific shape wherein the component may take the form of the specific shape but may exhibit variations or deviations that make the component slightly different than the exact specified shape. For example, and without limitation a component having a substantial trapezoidal shape may contain the shape of a trapezoid however the legs of the trapezoid may be curved at an end. In another non limiting example, a component may be substantially trapezoidal, however a base of the trapezoid may contain a slight curvature. In one or more embodiments, web skin 124 may include an arched portion, wherein inner flange 120 may be located at or near the arched portion. In one or more embodiments, web skin 124 may include a closed end and an open end wherein inner flange 120 may be situated at or near the closed end. In one or more embodiments, web skin 124 may include predominantly or substantially 'U' shape wherein the closed end of web skin 124 may be situated at the closed end of the U-shape and the open end may be situated at the open end of the U-shape. In one or more embodiments, web skin 124 may include a flat sheet that has been shaped into a trapezoidal and/or U-shape. In one or more embodiments, the flat sheet may contain a length of L1. In one or more embodiments, the flat shape may be formed to create a width of W1 at a first end and/or an open end and a Width W2 at a second and/or closed end. In one or more embodiments, web skin 124 may encapsulate at least a portion of structural foam 104 wherein a portion of structural foam 104 may be situated between a boundary created by web skin 124. In one or more embodiments, at least a portion of structural foam 104 may be encapsulated by webs kin wherein more than one surface of web skin 124 surround structural foam 104 or a portion thereof.

With continued reference to FIG. 1, in one or more embodiments, web skin 124 may be attached to and/or adhered to outer flange 116. In one or more embodiments, web skin 124 may contain an open end and a closed wherein outer flange 116 may be located at or near the open end. In one or more embodiments, web skin 124 may include curved ends wherein the curved ends may allow for adhesion of web skin 124 to outer flange 116. In one or more embodiments an end of web skin 124 may include a partial hook shape wherein the partial hook shape may allow for increased surface contact between web skin 124 and flat material such as outer flange 116. In one or more embodiments, the curved ends may allow for increased surface area contact between outer flange 116 and inner flange 120. In one or more embodiments, aircraft component 100 may include an adhesive 128 such as any adhesive as described in this disclosure. In one or more embodiments, adhesive 128 may be situated between the web skin 124 and at least the structural foam 104, wherein the structural foam 104 is affixed to the web skin 124. In one or more embodiments, adhesive 128 may provide for adhesion of web skin 124 to structural foam 104. In one or more embodiments, adhesive 128 may prevent movement of web skin 124 and/or structural foam 104 during a molding process. In one or more embodiments, adhesive 128 may bind web skin 124 to structural foam 104 to provide web skin 124 with a predetermined shape prior to a molding process. In one or more embodiments, inner flange 120 may be encapsulated by web skin 124 and structural foam 104 wherein a longitudinal surface area of inner flange 120 may be covered by web skin 124 and structural foam 104. In one or more embodiments, web skin 124 may blanket one portion of a longitudinal surface area of inner flange 120 while structural foam 104 may blanket the remaining longitudinal surface area of inner flange 120. In one or more embodiments, portions of aircraft component 100 may act as an adhesive without any additional adhesive materials. For example, and without limitation, various portions of aircraft component 100 prior to a molding process may contain an uncured resin wherein the uncured resin may adhere to other portions of aircraft component 100. Following a molding process, the two components may stay stuck or adhered to one another. In one or more embodiments, an uncured resin such as any resin as described in this disclosure may contain adhesive properties due to their high viscosity, the adhesive additives within the resin and other chemical properties that cause the adhesion of an uncured resin to a surface or another material. In one or more embodiments, introduction of an uncured resin may bind structural foam 104 and web skin 124 to one another following a molding process. In one or more embodiments, uncured resin may stick to structural foam 104 and remain adhered to structural foam 104 following curing of the resin wherein web skin 124 may be adhered to structural foam 104. In one or more embodiments, adhesive may include an uncured resin within web skin 124 wherein structural foam may be bound to and/or adhered to web skin 124. In one or more embodiments, a process of binding web skin 124 to structural foam may include introduction of an uncured web skin 124 and curing the web skin 124 while it remains adhered to structural foam. In one or more embodiments, a resin within web skin may act both as an adhesive between web skin 124 and structural foam 104 as well as matrix for the carbon fiber material within web skin 124. In one or more embodiments, following evacuation of air within a closed mold during a molding process, liquid plastic (epoxy) resin and/or any other resin may be injected to saturate a dry carbon fiber material of web skin 124 and fill all voids within the mold. After this step is complete, the mold may be heated to cure the resin from a liquid state to a hardened state. Only after hardening may the carbon fiber material and foam elements, such as structural foam 104, be considered adhered. Similarly, some structural foams, such as any structural foam as described in this disclosure may contain interlocking properties due to their porous or textured surface wherein prior to expansion of the structural foam, the structural foam may adhere to a surface such as, but not limited to, a surface of web skin 124. In one or more embodiments, aircraft component 100 may include an outer flange 116 situated at a first end and an inner flange 120 situated near a second end. In one or more embodiments, structural foam 104 and inner flange 120 may be encapsulated by web skin 124 and outer flange 116. In one or more embodiments, web skin 124 and outer flange 116 may be attached to and/or adhered to each other wherein structural foam 104 and inner flange 120 may be situated between outer flange 116 and web skin 124. In one or more embodiments, outer flange and/or inner flange may be adhered to any components of aircraft component 100 through the use of adhesives such as epoxies, glue through stitching and in any other way as described in this disclosure. In one or more embodiments, web skin 124 and outer flange 116 may define a closed boundary wherein structural foam 104 and inner flange 120 may be situated within the boundary. In one or more embodiments, pressure loads on aircraft component 100 may be loading aircraft component 100 from below, wherein below refers to a direction from inner flange 120 to outer flange 116. This puts the wide outer flange 116 in compression and the narrow inner flange 120 in compression.

Figure 2:
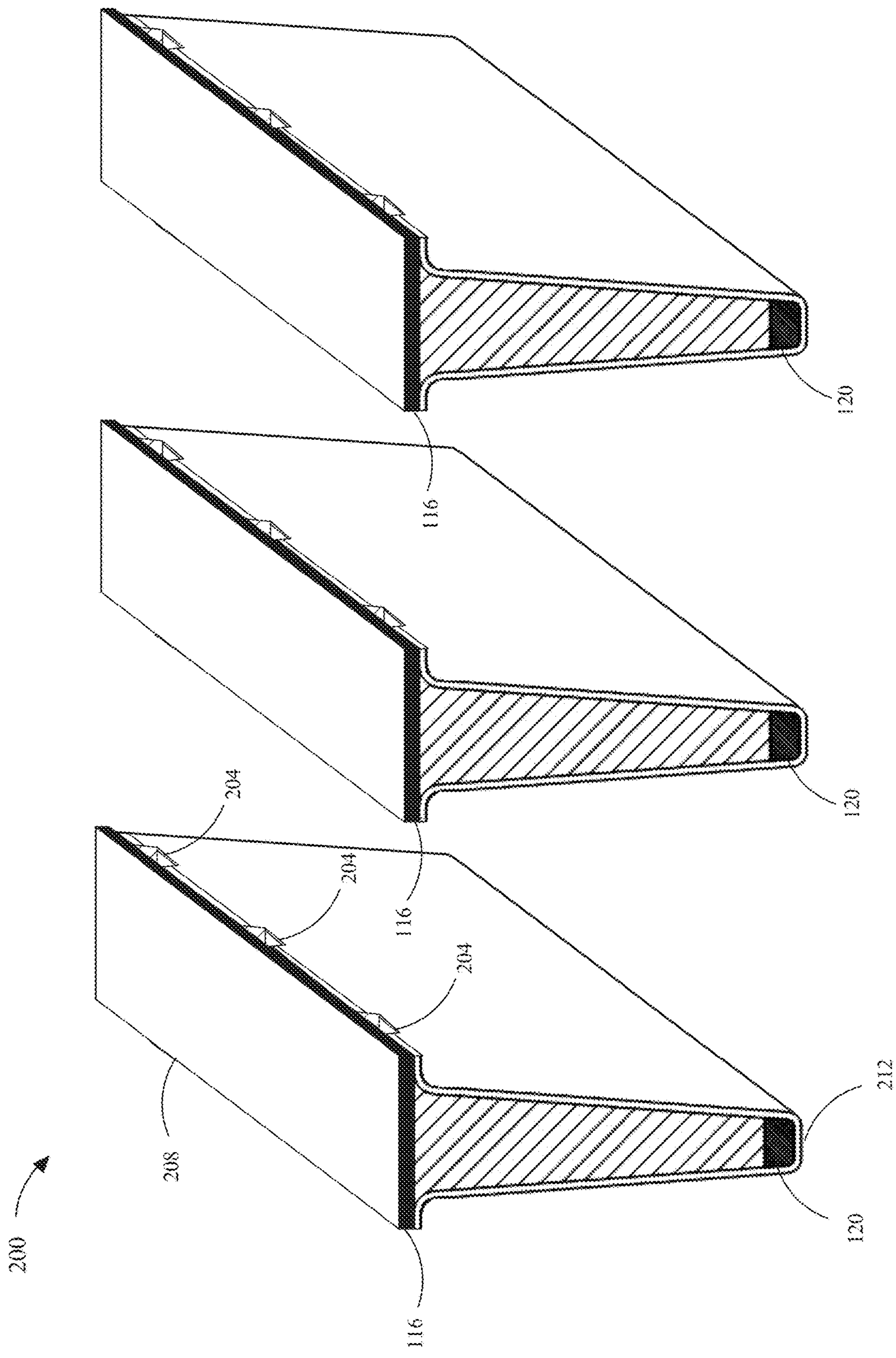
FIG. 2 is another exemplary embodiment of an aircraft component according to the subject disclosure.

Referring now to FIG. 2, another exemplary embodiment of an aircraft component 200 is described. In one or more embodiments, aircraft component 200 may include a receiving portion 204. "Receiving portion," for the purposes of this disclosure, is a cavity within aircraft component 200 that is configured to receive an aircraft part. An aircraft part may include a frame, a stringer, a beam and/or any other structural elements. In one or more embodiments, receive portion may extend at or near first end 208 of aircraft component 200 in a direction towards a second end 212 of aircraft component 200. In one or more embodiments, aircraft component 200 may include more than one receiving portions 204 wherein each receiving portion 204 may be configured to receive another aircraft part. In one or more embodiments, multiple aircraft components 200 may be situated on an aircraft wherein each receiving portion 204 on each aircraft component 200 may be configured to receive a portion of aircraft part. For example, and without limitation, aircraft part may include a long beam situated orthogonal to each aircraft component 200 of a plurality of aircraft components 200.

Figure 3:
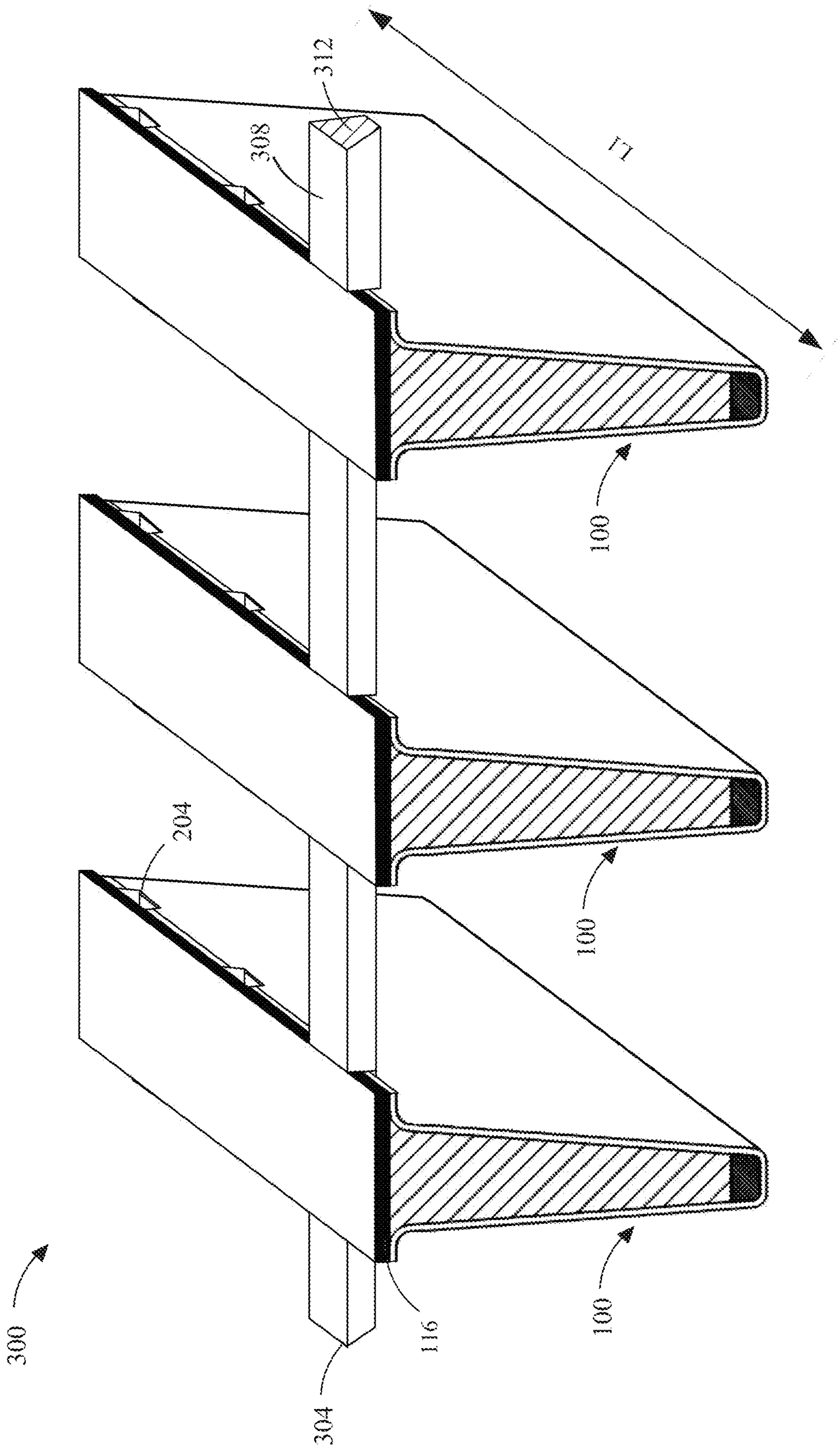
FIG. 3 is an exemplary embodiment of an aircraft component assembly according to the subject disclosure.

Referring now to FIG. 3, an exemplary embodiment of an aircraft component assembly 300 is described. In one or more embodiments, aircraft components 100 may be configured to receive stringer components 304. In one or more embodiments, aircraft component 100 may provide structural stability in one direction while stringer components 304 provides structural stability in a direction orthogonal to aircraft components 100. In one or more embodiments, each receiving portion 204 of aircraft component 100 may be configured to receive another stringer component 304. In one or more embodiments, aircraft component 100 may include multiple receiving portions 204 situated along a length L1 of aircraft component 100. In one or more embodiments, stringer components 304 may be situated orthogonal to outer flange 116 or aircraft component 100. In one or more embodiments, stringer component 304 may be situated within receiving portions 204 wherein aircraft component 100 may contain a predominantly or substantially flat surface at a first end along length L1 wherein stringer component 304 is inserted into receiving portion 204. In one or more embodiments, stringer component 304 may be substantially flush with as surface of outer flange 116 when stringer component 304 is placed within receiving portion 204. In one or more embodiments, receiving portion may be situated near a surface of outer flange 116 wherein stringer component 304 may be substantially in contact with and/or substantially near outer flange 116. In one or more embodiments, receiving portion 204 may extend from a surface of outer flange 116 in a direction of inner flange 120. In one or more embodiments, receiving portion 204 may be situated between outer flange 116 and inner flange 120. In one or more embodiments, stringer component 304 may include a foam core 312. Foam core 312 may be consistent with structural foam 104 and/or core filler as described in this disclosure. In one or more embodiments, stringer component 304 may include a stringer skin 308 wrapped around foam core 312. In one or more embodiments, stringer skin 308 may include a sleeve that is configured to wrap around foam core 312. In one or more embodiments, stringer skin 308 may include a carbon fiber material such as any carbon fiber material as described in this disclosure. In one or more embodiments, stringer component 304 may be located substantially near first end 208 (As shown in FIG. 2). In one or more embodiments, stringer component may be substantially flush with first end 208 and/or outer flange 116. In one or more embodiments, stringer component 304 may vary in thickness wherein along a longitudinal portion of springer component 304 wherein various portions of stringer component may be non-uniform. In one or more embodiments, portions of stringer component that are to be placed within and/or through receiving portion may be smaller in thickness to allow for stringer component to pass through. In one or more embodiments, portions of stringer component 304 not placed within receiving portion may contain a larger thickness such that stringer component may be located substantially near first end and/or flush with outer flange. In one or more embodiments, an upper surface of stringer component 304 may be located beneath outer flange 116 in area in which stringer component is located within receiving portion. Additionally, in one or more embodiments, an upper surface of stringer component 304 may be flush with outer flange 116 at a first end 208 in areas in which portions of stringer component may not be located within receiving portion 204. In one or more embodiments, portions of stringer component 304 may vary in thickness. In one or more embodiments, stringer component may contain grooves wherein the grooves may allow for stringer component 304 to be placed within receiving portion 204. In one or more embodiments, portions of stringer component 304 containing grooves may be placed within receiving portion 204. In one or more embodiments, grooves on stringer component 304 may allow for a surface of stringer component to be flush with a surface of outer flange 116 at a first end. In one or more embodiments, grooves on stringer component 304 may further allow for portions of stringer component 304 to be placed beneath outer flange 116 and/or between outer flange 116 and inner flange 120. In one or more embodiments, stringer component 304 may include an aluminum, aluminum alloy and/or any other materials as described in this disclosure. In one or more embodiments, stringer component 304 may be predominantly or substantially rectangular and/or trapezoidal in shape. In one or more embodiments, stringer component 304 may be predominantly circular in shape. In one or more embodiments, stringer component 304 may include but is not limited to a circular cross section, a semicircular cross section, a trapezoidal cross section, a rectangular cross section, a triangular cross section, an oval cross section and the like. In one or more embodiments, receiving portion 204 may contain a shape similar to that of stringer component 304 about a cross section wherein receiving portion 204 may be configured to receive stringer component 304. In one or more embodiments stringer component 304 may be adhered to aircraft component 100.

Figure 4:
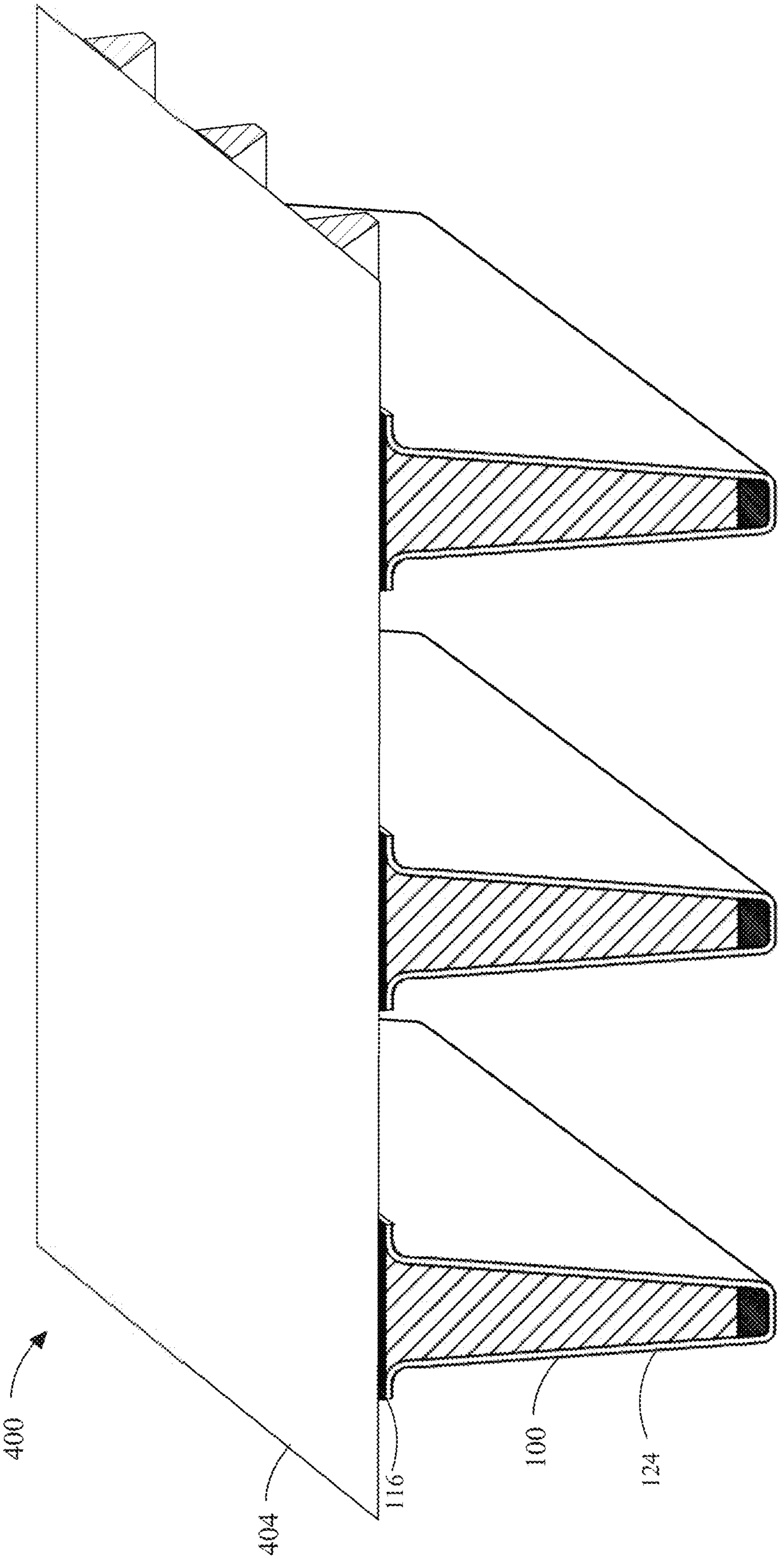
FIG. 4 is an exemplary embodiment of an aircraft structure according to the subject disclosure.

Referring now to FIG. 4, an exemplary embodiment of an aircraft structure 400 is described. In one or more embodiments, aircraft component 100 may include a portion of a skeletal structure of an aircraft. In one or more embodiments, aircraft component 100 may be consistent with frame as described in further detail below. In one or more embodiments, a skeletal structure of an aircraft may include a frame wherein the outer mold line skin 404 the aircraft is adhered to the frame. In one or more embodiments, skeletal structure of an aircraft may provide the shape of an aircraft. In one or more embodiments, components of an aircraft may be adhered to skeletal structure of aircraft. In one or more embodiments, aircraft component 100 may include a portion of skeletal structure of aircraft wherein aircraft component 100 may include a frame and/or any other structural component configured to contain a pressure within the aircraft. In one or more embodiments, aircraft component 100 may include a portion of the skeletal structure of aircraft wherein aircraft component 100 may be attached to outer mold line skin 404 of an aircraft. In one or more embodiments, aircraft component 100 includes a portion of a blended wing body aircraft (BWB), the BWB having no demarcation between a wing and a main body of the aircraft structure. BWB may be described in further detail below. In one or more embodiments, aircraft component 100 may be adhered to outer mold line skin 404. In one or more embodiments, an aircraft may include a plurality of aircraft components 100 wherein each aircraft component 100 may include a portion of the skeletal structure of aircraft. In one or more embodiments, aircraft component 100 may provide containment and/or transfer of forces along one direction of aircraft wherein stringer component 304 may provider for containment and/or transfer of forces along an orthogonal direction of an aircraft. In one or more embodiments, aircraft structure may include adhesives, such as but not limited to, an epoxy, nails, glue and the like, which are configured to bind outer mold line skin 404 with aircraft component 100. In one or more embodiments, outer flange may be situated on outer mold line skin 404. In one or more embodiments, outer flange 116 may be situated on an inner surface of outer mold line skin 404 wherein an outer surface of outer mold line skin 404 may include the outer surface of an outer mold line of an aircraft. In one or more embodiments, aircraft component may be situated orthogonal to farm wherein outer flange may be connected to outer mold line skin 404 and inner flange may be situated at a further possible length from outer mold line skin. In one or mor embodiments, aircraft component 100 may extend orthogonally to outer mold line skin wherein a heigh as defined by the distance between first end 208 and second end 212 may be positioned orthogonally to a surface of outer mold line skin 404.

Figure 5:
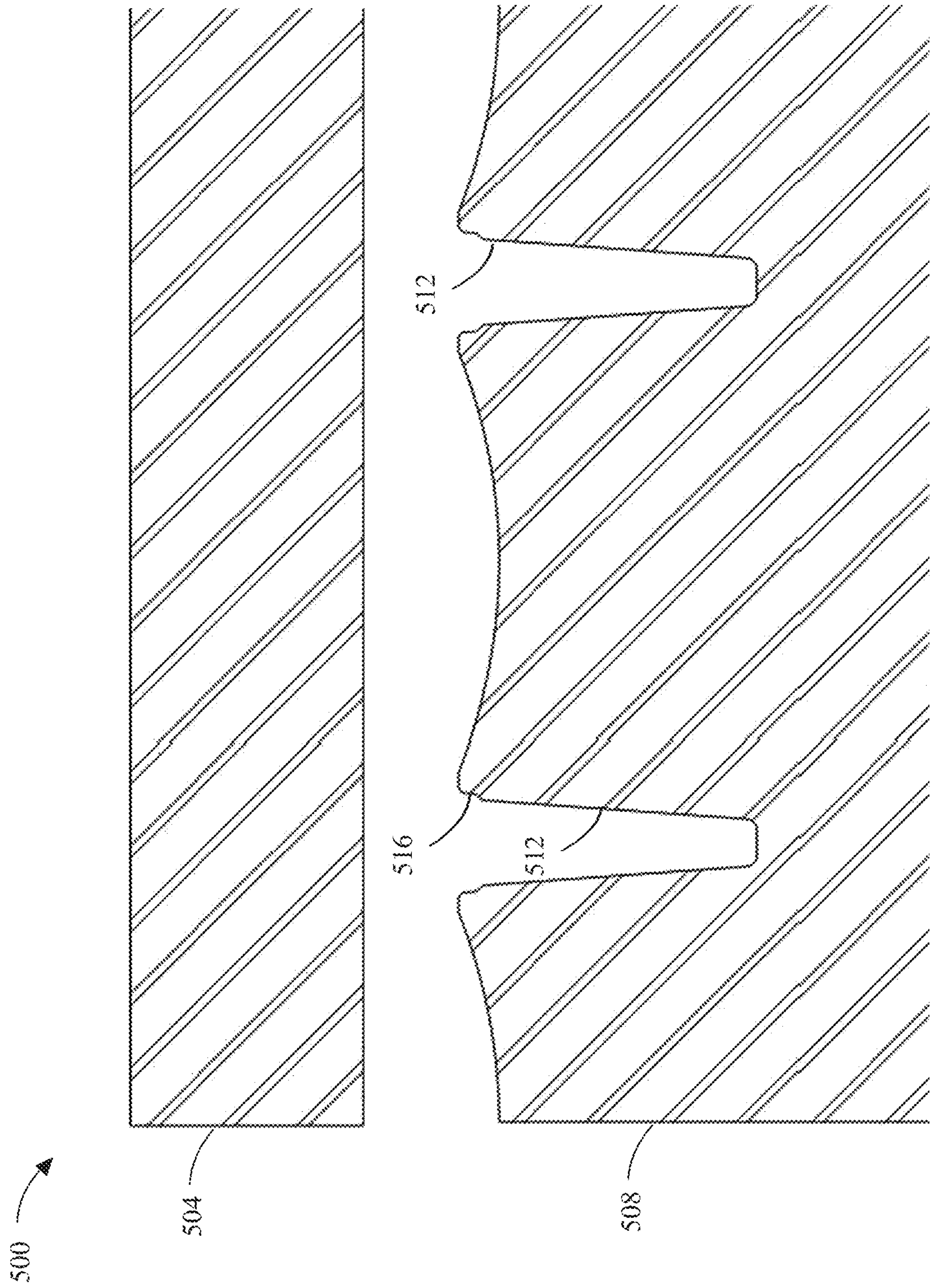
FIG. 5 is an exemplary embodiment of a component mold according to the subject disclosure.

Referring now to FIG. 5, an exemplary embodiment of a component mold 500 is described. In one or more embodiments, component mold 500 may include a mold that is used to create and/or manufacture aircraft component 100. In one or more embodiments, component mold 500 may be used during an infusion process to infuse a resin into one or more carbon fiber materials within component mold 500. In one or more embodiments, component mold 500 may be used to create aircraft components 100, aircraft structure and/or any other aircraft structure as described in this disclosure.

With continued reference to FIG. 5 component mold 500 may be used to create composite structures. Composite structures may consist of at least two different materials. One may be a "matrix" that surrounds a reinforcement material. Using concrete as an example, the matrix may be concrete, and the reinforcement may be steel rods ("rebar"). Matrix materials suitable for aircraft structures may include "thermoset" resins and "thermoplastics". A thermoset resin may be a two-part liquid. Mixing the two parts begins a chemical reaction that ultimately results in a solid, stable, and strong plastic material. For large aircraft, a favored type of thermoset resin may include epoxy. Some forms of epoxy resin may be cured at elevated temperatures to speed the chemical reaction to a solid. Once a thermoset resin has reached a solid state ("cured"), reversal to a liquid state is not possible. In contrast, "thermoplastic" materials may be a uniform (one-part) material that is solid at operational temperatures. When heated, it may become plastic (able to flow) or liquid (much lower viscosity). A thermoplastic material may be used as a matrix for a reinforcing material. It may then later be reheated to liquify it and remove it from the reinforcing material, or reform it (along with the fibers). Almost all aircraft composite matrix materials are thermoset resins. Furthermore, current thermoplastic materials are not suited for resin-infused structures because they generally have too-great viscosity even when heated. With continued reference to FIG. 5, aircraft reinforcement materials may be small diameter synthetic fibers such as glass or carbon fiber. Reinforcement fibers may be short in length ("chopped fiber") or relatively long. Structural properties of chopped fiber composites are substantially inferior to long fiber composites. Chopped fiber composites are little used in aircraft structures. An aspect of chopped fiber composites is that may be approximately uniformly mixed with a matrix material. This may then be injected into a closed mold to form a fiber-reinforced composite part. This enables very rapid production unfortunately offset by unfavorable structural properties. A common chopped fiber composite material is "glass-filled" nylon.

With continued reference to FIG. 5, There may be two primary methods by which composite aircraft structures or structural elements are formed. One common method uses pre-impregnated carbon fiber material ("prepreg"). This material may be provided by a materials manufacturer in thin sheets on a roll, for example. It may consist of a thin layer of parallel fibers that are encased in an epoxy resin that is partially cured. These materials may be layered onto a male or first mold half 504. A first mold half 504 is one in which the finished surface is against the mold. For example, a female fuselage mold may form the outer mold line (OML) of a fuselage surface. Sometimes, however, an inner mold line tool is used. The materials are layered in a selected order, orientation, thickness, and extent. The prepreg is then covered with a "peel ply" material that prevents the next layer, a "breather" from sticking to the laminate. The next layer is a "vacuum bag" that is sealed to the mold surface (beyond the part extent). The "stack" of mold, laminate, peel ply, breather and vacuum bag is then connected to a vacuum source. Atmospheric pressure then squeezes the laminate plies together. The breather layer enables the vacuum to reach all areas of the laminate surface by providing a porous pathway between the impermeable bag and the peel ply. This stack may then be placed in an "autoclave". This device combines features of an oven and a pressure tank. The part is then pressurized within the tank while retaining the stack's interior connection to a vacuum source. This increases the pressure on the laminate to about 100 PSI (roughly 7 bar). The autoclave is then heated to speed the chemical reaction curing of the epoxy matrix. When cured, the stack is removed from the autoclave. The bag, breather, and peel ply are removed and thrown away. The part is then trimmed. parts made with this method may have excellent mechanical properties. The molded surface may be very smooth and precise. The interior surface (bag side) may have a less refined surface that may reflect wrinkles, for example, from the peel ply, breather, or vacuum bag.

With continued reference to FIG. 5, an alternate method of aircraft structure fabrication is called "resin infusion". There are at least two methods of resin infusion. The first uses a dry fiber within a vacuum bag and the second uses dry fiber within a rigid, closed (surrounding) mold. These are described. A part may be resin infused in a manner similar to that of the vacuum-bagged prepreg part described above. The pre-impregnated fiber is replaced with "dry" fiber. "Dry" fiber is fiber without matrix resin—it is simply bare, dry fiber. The dry part also may include a peel ply and breather and a connection to a vacuum source. Additionally, a supply of recently mixed two-part epoxy resin is provided to the dry fiber. This may be provided by a selected manifold with the intention of providing resin uniformly to the laminate. Resin infusion may begin by evacuating air from the stack. Then resin of a selected (usually low) viscosity is injected into the stack via the manifold. This permeates the gaps between fibers, forming a matrix. When the laminate is fully infused, the resin supply is cut off. The stack may then be heated in an oven to cure the resin. When cured, the part may be removed from the oven. The vacuum bag, breather, and peel ply are removed and thrown away. Then the edges of the part are trimmed. Again, parts made with this method may have excellent mechanical properties. The molded surface may be very smooth and precise. The interior surface (bag side) may have a less refined surface that may reflect wrinkles, for example, from the peel ply, breather, or vacuum bag.

An aspect of the prepreg and infused vacuum bagged process pertains to integrated assemblies. Some aircraft structures may, for example, be semi-monocoque structures. Such structure may combine a relatively thin skin with additional elements that may stabilize the skin. aircraft wings and fuselages may use a thin skin stabilized by stringers in one direction and by frames (for fuselages) or ribs (for wings) in an approximately orthogonal direction. It is possible to make these different elements separately and connect them after curing. It may be that such post-cure assembly is problematic. Mechanical fasteners such as screws may be used. These may require precise tooling to locate the parts with respect to each other. Precise hole location may be required. Fasteners and holes may result in increased local stresses around the holes that may result in structural failure or delamination. Solving this may increase weight. Alternatively, assembly may be done by bonding parts together. This method may require precise part location and a second heat cycle. It also may require stringent surface preparation at the bond line. Bonded parts may tend to peel apart and may lack an effective means of halting crack growth or arresting damage propagation. Assuring quality of bonded parts may be problematic. It may be advantageous to "co-cure" these elements in their selected position. This may avoid the need for mechanical fasteners and may reduce their tendency to delaminate underload or to propagate damage. Precise location and support of these elements may be substantially complicated by the enclosure of the assembly within the vacuum bag. Some elements may be accurately stitched to the skin before vacuum bagging. Other elements included rigid, integral components that provide support to the details. The complication of these details and their assembly by stitching may be offset by the substantial damage tolerance and damage arrestment provided by the stitching. A stitched pre-assembly is enabled by the dry fiber/resin infusion process. It is not possible with prepreg structures. Providing (creating) a vacuum bag for a complex part with stringer and/or frame details may be complicated by the three-dimensional nature of the pre-assembly. Additional tooling aids may be used to fill part corners to ensure pressure is applied by the vacuum bag.

An important aspect of vacuum-bagged composite structure may be the risk to the assembly posed by a vacuum bag leak. A small leak can prevent adequate pressure from being applied to the part during the cure cycle. Furthermore, it may introduce air bubbles into the resin, especially in the case of the resin infusion process. One small leak may spoil an entire assembly or a substantial portion of an assembly. This may result in an (expensive) scrapped part or extensive (expensive) rework.

A further aspect of vacuum-bagged, resin-infused parts is described. This pertains to the pressure at which infused resin may be injected into the assembly. A vacuum of one atmosphere (1 bar or ~14 PSI) may be drawn on the bagged assembly. Resin may be injected into the bagged assembly at up to one bar. Above one bar, the resin pressure exceeds atmospheric pressure and may tend to bulge the enclosing vacuum bag outwards with resin. A part cured in this condition may have both excessive resin and poorly consolidated fibers. This may be unfavorable to mechanical properties and to weight.

It may be disadvantageous to limit resin infusion pressure to such a (low) value because it may tend to limit the rate at which resin can be infused. This may be offset with a lower viscosity resin. However, this may present drawbacks. Reduced viscosity may be provided with a resin chemical composition that provides reduced viscosity. Such resins may tend to have less favorable mechanical properties when cured than more viscous resins. Alternatively, viscosity may be reduced by heating the resin (and perhaps the mold). This may result in the adverse consequence of starting the cure process too early and speeding the cure process. This tends to limit the time available for infusing the parts, risking incomplete infusion. This may be contrary to the object of heating the resin which was to decrease viscosity to speed infusion.

With continued reference to FIG. 5, a BWB configuration as described below may include a pressurized center body with a nose, aft body, left and right smooth transitions to left and right wings and winglets. The pressurized center body may form what may be referred to as a "flat sided pressure vessel". This may be contrasted, for example, with a cylindrical or spherical pressure vessel. A cylinder or sphere may resist internal pressure purely by tension in the vessel. This is very efficient and lightweight because composite materials have good tensile strength. Also, pure tension structures require no stabilization against pressure. Pressure drives the surface to a stable configuration. In contrast, a BWB center body may resist internal pressure with a series of large panels that may resist pressure largely by bending flexure for which a skin may be favorably stiffened by additional elements. Upper and lower center body skin structures may be connected by a peripheral bulkhead and internal elements that may also be favorably stiffened with additional elements. This may be an inefficient and heavy system in comparison with a cylindrical fuselage. Furthermore, it may be an important aspect of pressurized aircraft fuselage design that a substantial pressure load is placed on the structure each flight. Structural loads may cycle each flight from a low to high value. For this reason, structural fatigue may be a concern.

In one or more embodiments, a BWB aircraft may include carbon fiber materials wherein the BWB aircraft may include increased strength and reduced weight. A similar structural system may be selected for some or all of the airplane's other major structural components (nose, aft body, left and right smooth transitions to left and right wings and winglets). An aspect of these components is that it may be favorable to produce "integrated" semi-monocoque components of relatively large size. "Integrated" in this context means that all or many elements of a semi-monocoque structure are made in a single molding and infusing operation. This may be contrasted with a method that makes individual elements (skin, stringer, frame) separately and then later joins these parts.

With continued reference to FIG. 5, component mold 500 may be used to create aircraft components 100 and/or aircraft structure. In one or more embodiments, component mold 500 may include a two-sided mold. In one or more embodiments, the two-sided mold may include a first mold half 504 and a second mold half 508. In one or more embodiments, the two-sided mold may allow for closed molding processes. In one or more embodiments, component mold 500 may include a closed mold wherein the closed mold include a first mold half 504 and second mold half 508. In one or more embodiments component mold 500 may include a first mold half 504 and a second mold half 508 wherein the second mold half 508 may be opened to initially place a dry "preform." A "preform" may be an assembly of dry carbon fiber materials and other elements that serves primarily as the reinforcing element in a completed composite structure. In one or more embodiments, the preform may include a carbon fiber material such as dray carbon fiber sheet. In one or more embodiments, the preform may include web skin 124 prior to infusion of resin. In one or more embodiments, the preform may include additional elements. These may be elements that maintain the geometric relationship of the carbon fibers during handling and within the mold. Such elements may include through-the-thickness stitching, thermoplastic threads, or other elements such as staples or even light, flexible glue. Additional elements may include components that may stabilize the completed structure. Such elements may include foam plastic cores such as the core in a sandwich panel.

With continued reference to FIG. 5, in one or more embodiments, component mold 500 includes a mold cavity 512. In one or more embodiments, a preform may be placed within mold cavity 512. In one or more embodiments, the preform may include web skin 124. In one or more embodiments, the preform may include dry carbon fiber sheets prior to a molding process. In one or more embodiments, web skin 124 may be placed within mold cavity 512 wherein web skin 124 may include a dry carbon fiber sheet that has not been infused with a resin. In one or more embodiments, web skin 124 may be inserted into mold cavity 512 wherein web skin 124 may substantially blanker the surface of mold cavity 512. In one or more embodiments, web skin 124 may blanket mold cavity 512 wherein a surface of mold cavity 512 is covered by web skin 124 and/or a preform. In one or more embodiments, web skin 124 may include a carbon fiber material such as dry carbon fiber sheet wherein web skin 124 may include a porous material. In one or more embodiments, web skin 124 following an infusion process may include a nonporous material wherein the porous material has been filled with resin. In one or more embodiments, web skin 124 may include a carbon fiber material wherein web skin 124 includes a carbon fiber material prior to an infusion process. In one or more embodiments, mold cavity 512 may include a predominantly or substantially trapezoidal shape about an axis. In one or more embodiments, mold cavity 512 may provide a shape for aircraft component 100, web skin 124 and/or structural form.

With continued reference to FIG. 5, In one or more embodiments, mold cavity 512 may include one or more substantially planar surfaces. In one or more embodiments, mold cavity 512 may include a cross section having a predominantly or substantially trapezoidal shape. In one or more embodiments, one or more corners of the predominantly or substantially trapezoidal shape may contain rounded edges to allow for removal of aircraft component 100 from component mold 500. In one or more embodiments, a component having a substantial specified shape may include a component having a specified shape with additional bumps, grooves, indents, and/or any other modifications. In one or more embodiments, the trapezoidal shape may be selected to provide aircraft component 100 with a selected and favorable draft angle. This may permit aircraft component 100 to be inserted into component mold 500 before the infusion and cure cycle. Furthermore, the draft may permit the cured and rigid aircraft component 100 to be removed from component mold 500 afterwards. Flat sides on aircraft component 100 may be favorable because it may result in crushing buckling loads on webs skin to be resisted without generating side loads that may lead to delamination or core crushing. In contrast, a convex curved face may result in a compression load tending to buckle the skin away from the core. Although a flat sided aircraft component 100 may be favorable, other shapes may exist and may provide other advantages.

Figure 6:
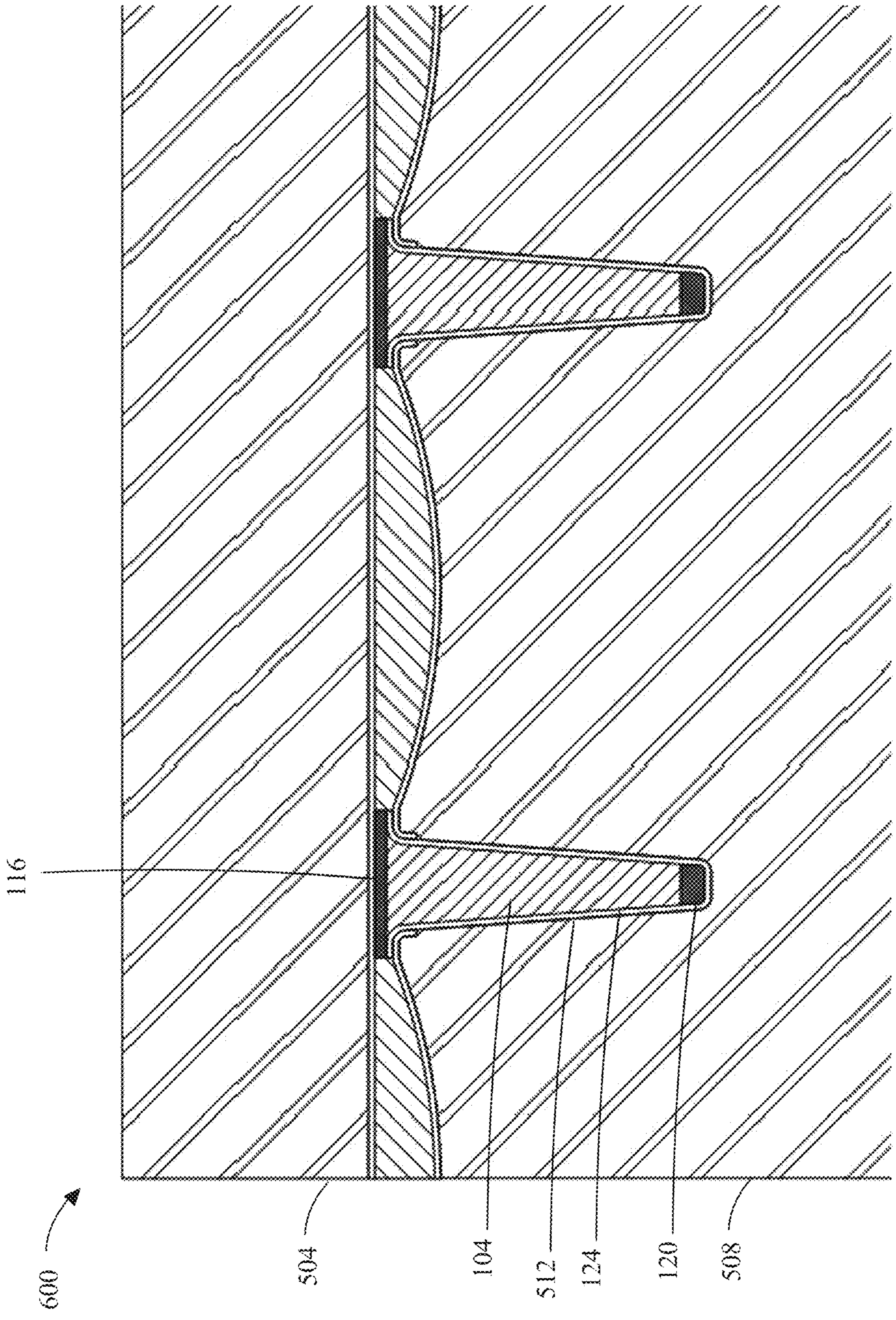
FIG. 6 is an exemplary embodiment of a component mold within an exemplary aircraft component according to the subject disclosure.

Referring now to FIG. 6, an exemplary embodiment of aircraft structure within a component mold 600 is described. In one or more embodiments, in a first step a mold component mold 500 may be received. In one or more embodiments, in a second step web skin 124 may be placed within mold cavity 512. In one or more embodiments, web skin 124 may blanket a surface of mold cavity 512. In one or more embodiments, web skin 124 may blanket mold cavity 512 wherein web skin 124 may predominantly or substantially take the shape of an outline or a surface of mold cavity 512. In one or more embodiments, web skin 124 may substantially take the shape of an outline or a surface of mold cavity wherein a portion of web skin 124 may contain the same shape as a portion of mold cavity. In one or more embodiments, in a third step, inner flange 120 may be inserted and/or placed within mold cavity 512 wherein inner flange 120 may be located between web skin 124 and surface of mold cavity 512. In one or more embodiments, insertion of web skin 124 and/or preform into mold cavity 512 may create an arched portion wherein inner flange 120 may be placed within arched portion. In one or more embodiments, Inner flange 120 may be in contact with web skin 124. In one or more embodiments, web skin 124 may wrap around a portion of inner flange 120 when inner flange 120 is inserted into foam cavity.

With continued reference to FIG. 6, in one or more embodiments, in a fourth step mold cavity 512 may be filled with structural foam 104. In one or more embodiments, mold cavity 512 may be filled with structural foam 104 wherein structural foam 104 may be situated on top of inner flange 120. In one or more embodiments, a surface of mold cavity 512 may be blanketed by web skin 124 and a portion of mold cavity 512 may be filled with inner flange 120. In one or more embodiments, structural foam 104 may fill any remaining cavities within mold cavity 512. In one or more embodiments, structural foam 104 may be located within mold cavity 512 wherein web skin 124 may be situated between structural foam 104 and mold cavity 512. In one or more embodiments, structural foam 104 may include an uncured or liquid state wherein in an uncured state structural foam 104 has not been cured and converted into a solid material having a given shape. In one or more embodiments, in an uncured state, structural foam 104 may take the shape in the container and/or cavity of which it is placed. In one or more embodiments, in a cured shape, structural foam 104 may retain the shape of the container or cavity in which it had been situated during a curing process. In one or more embodiments, mold cavity 512 may be filled with an uncured structural foam 104 wherein the uncured structural foam 104 is configured to fill mold cavity 512 and take the shape of mold cavity 512. In one or more embodiments, structural foam 104 may be cured while placed within mold cavity 512 wherein cured structural foam 104 may keep the shape of mold cavity 512. In one or more embodiments, structural foam 104 may contain a predetermined shape wherein structural foam 104 may already be in a cured form prior to placement of structural foam 104 within mold cavity 512. In one or more embodiments, filling mold cavity 512 may include placing structural foam 104 having a predetermined shape within structural cavity. In one or more embodiments, structural foam 104 may hold web skin 124 and web flange in place during a molding process. In one or more embodiment, structural foam 104 may act as a stiffening elements wherein the stiffening element may prevent movement of web skin 124 and/or inner flange 120 within mold cavity 512. In one or more embodiments, structural foam 104 may include a closed cell foam wherein the closed cell foam is impermeable to resin. In one or more embodiment, during a resin infusion process, structural foam 104 may prevent the infusion of resin within cavities occupied by structural form. In one or more embodiments, structural foam 104 may include a stiffening element wherein the stiffening element is configured to apply a force onto web skin 124 against surface of mold cavity 512. In one or more embodiments, the force applied onto web skin 124 may prevent introduction of resin into other areas of aircraft component 100 aside from the porous dry carbon fiber sheet. In one or more embodiments, structural foam 104 may include a predetermined shape. In one or more embodiments, web skin 124 may be wrapped around a portion of structural foam 104 and inner flange 120. In one or more embodiments, web skin 124 may be adhered to structural foam 104 prior to placement of web skin 124, structural foam 104, and inner flange 120 within mold cavity 512. In one or more embodiments, structural foam 104 may include a predetermined shape wherein web skin 124 may be adhered to structural foam 104 to provide web skin 124 with an outline of predetermined shape. In one or more embodiments, web skin 124 may be adhered to structural foam 104 wherein web skin 124 may be given a predetermined shape prior to placement of web skin 124 into mold cavity 512. In one or more embodiments, structural foam 104 may provide a shape to web skin 124 during a molding process. In one or more embodiments, structural foam 104 may stabilize web skin 124 during a molding process to prevent movement of web skin 124 during a molding process. In one or more embodiments, structural foam 104 may prevent introduction of a resin into a volume of aircraft component 100. In one or more embodiments, structural foam 104 may include a closed cell foam impermeable to a resin wherein resin may not be introduced into areas occupied by structural foam 104 within aircraft component 100. In one or more embodiments, a carbon fiber "perform" may be advantageously prepared by attaching and/or adhering the preform to a shaped structural foam 104. Following attachment, the preform and the structural foam 104 may be more easily inserted into the receiving mold cavity 512. The carbon material may be attached to the foam core by several means. These include adhesives, staples, stitching and the like as described in this disclosure. In one or more embodiment, structural foam 104 may provide a suitable draft angle to the aircraft component 100. In one or more embodiments, structural foam 104 may provide aircraft component 100 with a predominant trapezoidal shape. In one or more embodiment, structural foam 104 may also ease preparation of preforms as well as the insertion of the preforms in the mold cavity 512. In one or more embodiments, structural foam 104 may provide a shape for at least the web skin 124 wherein web skin 124 may retain its shape following a molding process. In one or more embodiments, prior to a molding process web skin 124 may include a porous dry carbon fiber sheet whereas following a molding process, web skin 124 may include a carbon fiber sheet infused with resin. In one or more embodiments, web skin 124 prior to a molding process web skin 124 may not be able to retain a shape whereas following a molding process web skin 124 may be able to retain a shape. In one or more embodiments, structural foam 104 may provide a shape for web skin 124 wherein structural foam 104 may prevent movement of web skin 124 within mold cavity 512 during a molding process. In one or more embodiments, inner flange 120 and structural foam 104 may predominantly or substantially take the shape mold cavity 512 wherein web skin 124 may act as a wrapping around structural foam 104 and inner flange 120.

With continued reference to FIG. 6, in one or more embodiments, a molding process may include preparation of a perform such as web skin 124, structural foam 104 and inner flange 120 as described above. In one or more embodiments a molding process may include preparation of component mold 500. In one or more embodiments, preparation of component mold 500 may include cleaning component mold 500 of any dirt or residue, applying a mold release coating and connecting new vent pipes and resin for introduction of resin during an infusion process. In one or more embodiments, molding process may include placement of web skin 124, structural form and preform into mold cavity 512. In one or more embodiments, outer flange 116 may be placed above structural foam 104 and above mold cavity 512 prior to the molding process. In one or more embodiments, outer flange 116 may be adhered to web skin 124 and structural foam 104 following a molding process. In one or more embodiments, outer flange 116 may be placed into component mold 500 wherein outer flange 116 may be situated outside at or near an opening end of mold cavity 512. In one or more embodiments, mold cavity 512 may include an indent 516 wherein the indent 516 may be configured to receive outer flange 116. In one or more embodiments, outer flange 116 may be configured to encapsulate structural foam 104, web skin 124 and inner flange 120 within mold cavity 512. In one or more embodiments, embodiments, a molding process may include closure of component mold 500 wherein closure may include the joining of first mold half 504 and second mold half 508. In one or more embodiments, molding process may include the removal of air within component mold 500ing using a vacuum such as any vacuum as described in this disclosure. In one or more embodiments, a molding process may further include heating of component mold 500. In one or more embodiments component mold 500 may be heated through electrical resistance heating wherein heating of the mold may allow for a liquid such as resin to flow through component mold 500. In one or more embodiments, molding process may further include heating of a resin, such as any resin as described herein. In one or more embodiments, resin may be heated to reduce viscosity. In one or more embodiments, reduced viscosity may allow for transfer of a resin into mold. In one or more embodiments, molding process may include introduction of resin into mold cavity 512 within component mold 500. In one or more embodiments, resin may include a mixed epoxy resin wherein mixed epoxy resin may include a curing agent. In one or more embodiments, mold cavity 512 may include one or more feeding channels wherein the feeding channels may feed resin into mold cavity 512. Ine or more embodiments, component mold 500 may include one or more sensors configured to monitor a flow of resin, a volume of resin, a temperature of resin and the like. In one or more embodiments, resin may enter into mold cavity 512 and bind with web skin 124 and/or dry carbon fiber sheet. In one or more embodiments, structural foam 104 may prevent the introduction of resin into a volume of aircraft component 100. In one or more embodiments, resin may flow along surface of mold cavity 512 wherein resin may fill the porous dry carbon fiber sheet. In one or more embodiments, component mold 500 may include resin vents wherein the resin vents may allow for the removal of excess resin within component mold 500. In one or more embodiments, resin may be introduced at a first end of component mold 500 wherein resin may flow through component mold 500 and out of one or more resin vents. In one or more embodiments, the presence of resin escaping from resin vent may indicate that component mold 500 has received a sufficient amount of resin necessary for molding dry carbon fiber sheet. In one or more embodiments, one or more sensos may be located at an outlet of one or more resin vents wherein the sensors may be configured to sense the air content from the outlets of resin vents. In one or more embodiments, resin vents may be closed upon an event such as a specific air content released from resin vent. In one or more embodiments, molding process may include the stopping of a flow of resin. In one or more embodiments, molding process may include controlling a temperature of component mold 500 during a curing process. In one or more embodiments, a specific temperature of a resin during a curing process may allow fast cure times. In one or more embodiments, temperature may be reduced, and a cooled fluid may be introduced in order to reduce the temperature of component mold 500 and the components within. In one or more embodiments, cooling of component mold 500 may allow for curing of resin. In one or more embodiments, web skin 124 may include a carbon fiber material. In one or more embodiments, web skin 124 may include a dry carbon fiber material. In one or more embodiments, dry carbon fiber material may include a porous carbon fiber material that does not contain resin. In one or more embodiments, a molding process may include introduction of resin into component mold 500 and infusing the carbon fiber material with the resin. In one or more embodiments, molding process may include a vacuum infusion process as described below. In one or mor embodiments, a vacuum may be used to reduce the pressure within component mold 500 wherein resin is drawn into mold cavity 512 due to pressure difference between resin and component mold 500.

Figure 7:
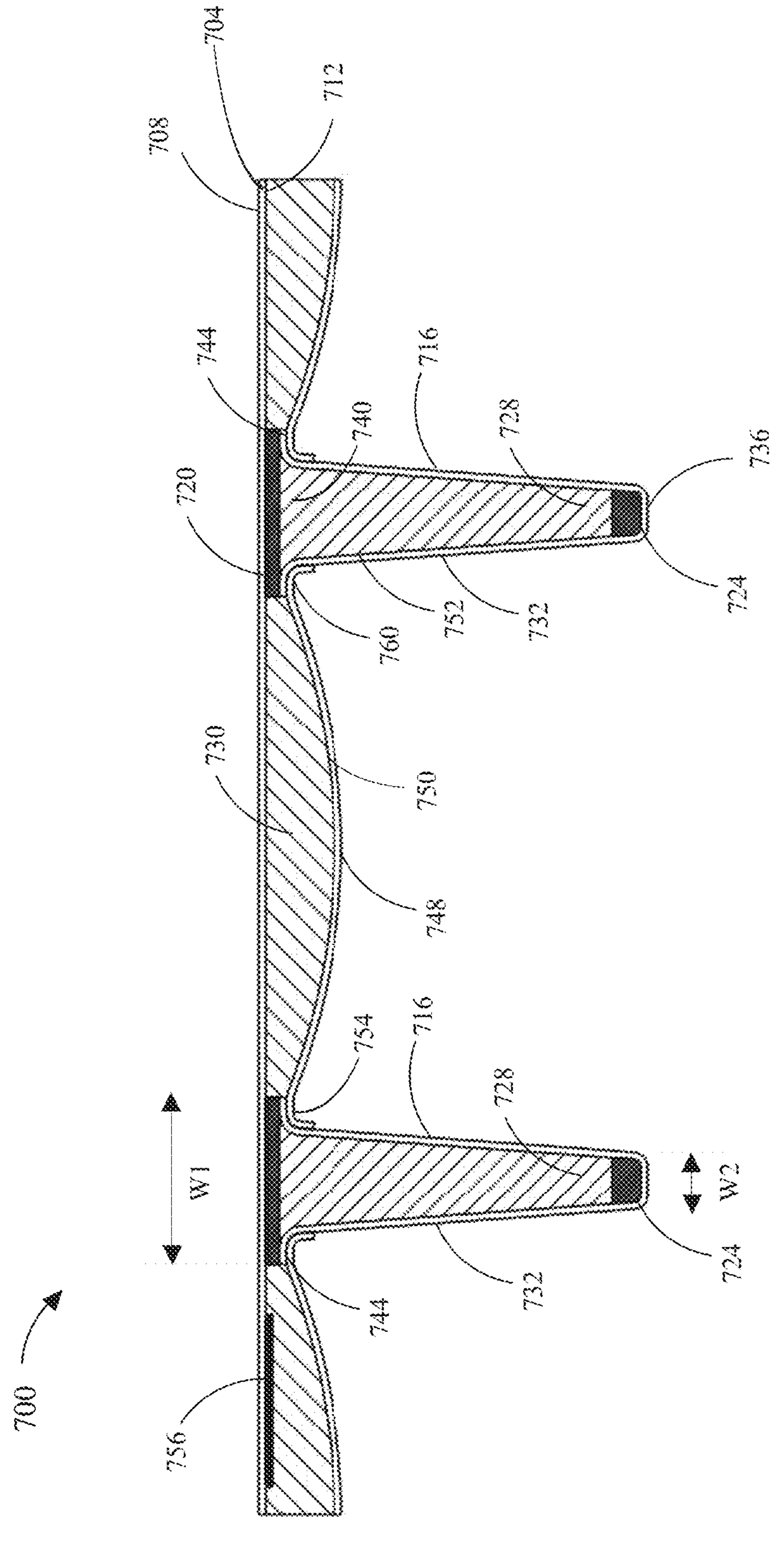
FIG. 7 is an exemplary embodiment of an aircraft structure according to the subject disclosure.

Referring to FIG. 7, the cabin of an aircraft that flies at high altitude may be pressurized. The enclosing surface of such a pressurized cabin may accordingly be sealed or nearly sealed to contain the pressure and reduce power required of the pressurization equipment. In one or more embodiments, the aircraft may contain a monocoque structure. "Monocoque structure" for the purposes of this disclosure refers to an aircraft structure in which the outer skin of the aircraft carries most of the stresses. In a monocoque structure, the outer skin of the aircraft acts as both a protective covering and the load-bearing structure. A "semi-monocoque structure" for the purposes of this disclosure refers to an aircraft in which stress or other loads are transferred to an internal structure of the aircraft. In a semi-monocoque structure, the outer skin of the aircraft may still carry loads, however the magnitude of the loads are minimized due to the internal structure of the aircraft.

The skin of semi-monocoque aircraft structures may favorably be on the exterior side of the supporting stringers and frames. This may provide a smooth surface favorable to low aerodynamic drag. Attachment of the outer skin to the supporting structure may transfer not only aerodynamic loads to the substructure but also must prevent pressure loads from separating ("blowing off") the outer skin from the substructure. Pressure loads may often far exceed aerodynamic loads. Such a separation is unfavorable. It may lead to a rupture of the outer skin and a loss of cabin pressure. For these reasons, it may be favorable to securely attach the outer skin to the substructure. Additionally or alternatively, this connection method may resist rapid growth of the separation if for some reason separation occurs. Regulations may stipulate that a separation is constrained to a selected small area. For example, and without limitation, a pressurized semi-monocoque structure may be required to prevent any separation or failure from spreading beyond two bays. "Bay" for the purposes of this disclosure, may be a region of skin bounded by two adjacent stringers and two adjacent frames. In the context of tubular aluminum fuselages of aircraft, skin failures may be caused in the form of fatigue cracks. As a result, crack growth may be limited by the outer skin's connection to the stringers and frames.

The skin and/or outer skin of a pressurized semi-monocoque structure may include the exterior surface of an aircraft. As a result, it may be beneficial to aerodynamic drag for this surface to be smooth and without waviness or irregularities. In one or more embodiments, skins having a smaller thickness may provide little resistance to bending due to their low thickness and consequent low moment of inertia. That is, skins may be ineffective at resisting deflection in bending. Bending deflection results in differential strain through the skin thickness. An upward bend, for example, may cause a compression strain in the upper portion of the skin and a tension strain in the lower portion. Skins supported by, for example, stringers and frames may instead tend to resist out-of-plane deflection primarily by a change in in-plane strain with deflection. That is, a skin may have a shape that resists pressure deformation by straining the entire thickness of the skin approximately equally. For example, spherical skin may resist pressure by placing the entire skin in tension equally through the thickness. A large change of strain with deflection results in little deflection under pressure load, and vice-versa. Tubular fuselages with semi-monocoque skins may resist pressurization loads in part by hoop tension in the skin panels. The curved form of the skins resists deformation effectively because any deflection must result in a substantial change in the skin's circumferential length (strain). Pressurized semi-monocoque tubular fuselages may tend to have low surface deformation at operational pressures. As a result, this may provide favorably low aerodynamic drag.

In one or more embodiments, an aircraft having flat semi-monocoque skins may resist pressurization loads as a membrane (like a drumhead). Under zero pressure, the skin may be flat or have slight curvature. Light pressure may easily deflect the skin (relative to the supporting substructure) into an approximate concave surface (as seen from the pressure side). Deflection may be relatively large because skin strain increases little with initial deflection. As pressure is increased, the now-concave skin may be increasingly rigid, so additional deflection may diminish with additional pressure. This is because skin strain increases more rapidly with deflection. At operational cabin pressures, the skin's deflected shape may be unfavorable to aerodynamic drag. Increased skin thickness may however reduce deflection at the expense of increased weight.

In one or more embodiments, aircraft cabins may contain noise during flight. Perceived noise at the ear may be the result of variations in air pressure with time. Noise within a cabin may stem in part from variations in air pressure (over time) at the cabin's skin. These variations may be, for example, the result of aerodynamic turbulence along the skin or from noise radiated from the engine. Variations in air pressure on the outside of the cabin skin may deflect the skin out of plane. The deflected skin may then radiate noise into the cabin in the manner of a loudspeaker cone or drumhead. The degree to which external noise is translated into the cabin may then be related to the deflection of the cabin skin with external pressure. A rigid skin may transmit less noise. Other characteristics may also be a factor. These may include the mass of the skin and, in combination with skin rigidity, its resonant frequency or frequencies. Another characteristic may pertain to damping. A well-damped skin may transmit less noise. An aircraft with a flat semi-monocoque cabin with thin skins may transmit an unfavorable amount of exterior noise into the cabin. Cabin noise may diminish with pressurization due to concave skin deflection and increased skin rigidity as described in further detail in this disclosure.

In one or more embodiments, an aircraft may operate in environments with a wide range of temperature. Fuselage skin temperatures may reach above 740° F. on a hot, sunny day. Cruising at altitude, the outside air temperature may be −65° F. or lower. Over this range, it may be advantageous to maintain the interior cabin temperature at a value comfortable to passengers or crew, for example. This temperature may be maintained by an environmental control system. "Environmental control system" for the purposes of this disclosure is a system on an aircraft that is configured to provide suitable temperature conditions for passengers during flight. Environmental control system may increase heating or cooling systems configured to provide heat in or cooling suitable for the passengers during flight. The capacity of the environmental system may be selected according to a maximum temperature differential (outside to inside) divided by a factor pertaining to cabin thermal insulation. Other factors may pertain including sunshine, humidity, air density (altitude), and airspeed. Environmental control system weight and power requirements increase unfavorably with capacity. This may be offset by increasing cabin thermal insulation. A selected design may balance thermal insulation and environmental control system capacity. as a result, a method of providing a selected thermal insulation with decreased weight or cost is favorable.

In one or more embodiments, another aspect of aircraft insulation pertains to moisture condensation. An aircraft may provide insulating material just inside the cabin skin. There may be a gap between the insulating material and the skin. During cruise with very cold outside air temperatures, the cabin skin may become cold. Due to the high thermal conductivity of materials such as aluminum or carbon fiber, an aircraft skin having such material may transfer heat through the aircraft skin. In addition, moisture within the cabin air may tend to condense on the interior surface of the skin. It may even freeze and accumulate on the surface. The rate at which accumulation occurs may depend on the thermal conductivity of the skin, cabin air humidity, and the access of cabin air to the skin. If insulation is attached directly to the skin of the aircraft and air cannot get to the cold skin surface, then condensation and frost may not form.)

When the airplane descends to lower, warmer altitudes, accumulated frost may melt and then run along cabin walls or may even drip into the cabin. (This may be referred to as "rain in the plane".) The rain in the cabin may be unfavorable to passengers. In addition, condensation may drain to the airplane's "bilge" area resulting eventually in unfavorable corrosion or other problems.

With continued reference to FIG. 7, an aircraft structure 700 is described. In one or more embodiments, aircraft structure 700 may include a structure for an aircraft, such as an aircraft having a tubular fuselage, blended winged body aircraft and/or any other vehicle capable of providing thrust in order to propel through a medium such as air. A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, BWB aircraft may have distinct wing and body structures, which are smoothly blended together with no clear dividing line or boundary feature between wing and fuselage. This contrasts with a flying wing, which has no distinct fuselage, and a lifting body, which has no distinct wings. BWB is described in further detail below such as in reference to FIGS. 3 and 5.

With continued reference to FIG. 7, aircraft structure 700 includes an outer mold line skin 704. "Outer mold line" for the purposes of this disclosure refers to an outer surface of an aircraft. In one or more embodiments, the outer mold line may include the outer surface of a fuselage of the aircraft, the outer surface of a wing of the aircraft, and the like. "Outer mold line skin" for the purposes of this disclosure refers to a material that encapsulates the aircraft or a portion of the aircraft. In one or more embodiments, a surface of outer mold line skin 704 may include the outer mold line or a portion thereof. In one or more embodiments, outer mold line skin 704 may protect the aircraft from outside elements, such as but not limited to, rain, cold air, hot air and the like. In one or more embodiments, outer mold line skin 704 may be used to contain pressure within the aircraft. In one or more embodiments, outer mold line skin 704 may encapsulate an outer surface of aircraft. In one or more embodiments, outer mold line skin 704 may include an outer surface 708 of outer mold line skin 704 and an inner surface 712 of outer mold line skin 704 located on an opposing end of outer surface 708 of outer mold line skin 704. In one or more embodiments, outer mold line skin 704 may include a smooth surface. In one or more embodiments, outer surface 708 of outer mold line skin 704 may include a smooth surface. "Smooth surface" for the purposes of this disclosure refers to a surface that contains minimal projections. In one or more embodiments smooth surface may provide for aerodynamic drug. In one or more embodiments, outer mold line skin 704 or a portion thereof may be substantially planar. Substantially planar may include a flat surface that contains minimal curvature. In one or more embodiments, substantially planar may include a flat surface that includes bumps and/or any other deformation due to manufacturing processes. In one or more embodiments, substantially planar may include a surface in which more than 75% of the surface is flat. In one or more embodiments, substantially planar may include a surface having minimal curvature. In one or more embodiments, outer mold line or a portion thereof may be substantially flat. In contrast, to an aircraft having a tubular fuselage and corresponding tubular outer skin surface, aircraft structure 700 may include outer mold line skin 704 having a substantially planar and/or substantially flat surface or structure. In one or more embodiments, aircraft structure 700 may include substantially planar surfaces in areas of an aircraft such as but not limited to an upper surface of an aircraft fuselage, a lower surface of an aircraft fuselage, the leading-edge surfaces of an aircraft, surface at or near the pressure bulkheads of the aircraft and the like. In one or more embodiments, outer mold line skin 704 may contain curvature wherein outer mold line skin 704 is not substantially planar. In one or more embodiments, outer mold line skin 704 may contain curvature in areas in which the aircraft contains some curvature. For example, outer mold line skin 704 may contain curvature in areas such as between a transition of a wing of a blended wing body aircraft and the main body (as described in further detail below).

With continued reference to FIG. 7, in one or more embodiments, a portion of aircraft structure 700 may include a flat-sided pressure vessel. As described in this disclosure "flat sided" refers to a surface that does contains minimal curvature. As opposed to conventional circular pressure vessels, similar to tube and wings aircraft, which may resist pressure with substantially pressure tension in the shell, a flat sided pressure vessel on an aircraft resists pressure by placing an aircraft skin in bending. Flat-sided pressure vessel may contain one or more walls or surfaces that are substantially flat. In some embodiments, flat-sided pressure vessel may include a bottom surface of a BWB aircraft. A bottom surface of BWB aircraft may be substantially flat or a portion of bottom of BWB aircraft may be substantially flat. Flat sided pressure vessel may further include an undercarriage of BWB, wherein the undercarriage refers to an area underneath a main body or a wing of an aircraft. In one or more embodiments, a main body of the aircraft structure 700 may include structural elements wherein structural elements are utilized to prevent crushing of flat-sided pressure vessel. In one or more embodiments, outer mold line skin 704 may include a portion of flat-sides pressure vessel. In one or more embodiments, outer mold line skin 704 may be configured to resist pressure or a portion thereof of flat sided pressure vessel.

With continued reference to FIG. 7, in one or more embodiments, outer mold line skin 704 may include one or more materials suitable for flight. In one or more embodiments, outer mold line skin 704 may include aluminum, an aluminum alloy and the like. In one or more embodiments, outer mold line skin 704 may include a carbon fiber material. "Carbon fiber material" as described in this disclosure is a material including carbon fibers. The carbon fibers may be spooled into carbon strands. In some embodiments, carbon fiber material may include a composite material. A "composite material" as described in this disclosure refers to a material which is produced from two or more materials. For example, a composite material may include a plurality of carbon fiber strands that are permeated with plastic resin. In some embodiments, carbon fiber material may include a carbon fiber lamina. A "lamina" for the purposes of this disclosure is a thin layer of material. For example, a lamina may be a thin layer of the composite material mentioned above. In some embodiments, carbon fiber material may include a carbon fiber lamina, the carbon fiber lamina having a plurality of carbon fiber strands. Carbon fiber material may further include a carbon fiber composite lamina wherein the carbon fiber composite lamina includes a thin layer of the plurality of carbon fibers combined with a resin. In one or more embodiments, carbon fiber material may further include a composite laminate having a plurality of layers. In one or more embodiments, composite laminate includes one or more composite laminae stacked upon each other. The one or more composite laminae may be held together through the use of a binding agent, such as an epoxy, stitching, nails, glue or the like. The composite laminate may have a quasi-isotropic layup. A "quasi-isotropic layup" as described in this disclosure is when the orientation of the one or more composite lamina are balanced such that there is a constant strength and stiffness of the composite laminate regardless of the direction in which a force is applied. In some embodiments, carbon fiber material may include a composite laminate wherein each lamina contains the same or substantially similar material. In some embodiments, carbon fiber material may include a composite laminate wherein each lamina contains one or more different materials.

With continued reference to FIG. 7, carbon fiber material may include a stitched resin infused carbon cloth. As described in this disclosure, "stitched resin infused carbon cloth" is a fibrous material, such as carbon, embedded within a resin and stitched together. Stitched resin infused carbon cloth may include a composite laminate wherein the composite laminate is held together and reinforced with stitching. Stitched resin infused carbon fiber cloth may further include a composite having a single layer. "Resin" as described in this disclosure is a compound consisting of a non-crystalline or viscous liquid substance. Resin may be reacted with a curing agent or a hardener in order to create a solid material. In some embodiments, resin may include vinylester resins, epoxy resins or any other lightweight resins with durability suitable for aircraft. Stitched resin infused carbon cloth may include stitching wherein the stitching binds the one or more composite lamina of the composite laminate. Carbon fiber material may be stitched using a modified lock stitch, a lock stitch, a chain stitch or the like. In some embodiments, carbon fiber material may be stitched using material such as polyester, aramid or a thermoplastic. Stitched infused carbon fiber cloth may further include a plurality of layers, wherein each layer is a composite of carbon fibers and resin. In some embodiments, stitching provides delamination resistance and improves damage tolerance of a composite laminate. In some embodiments stitched infused carbon fiber cloth is lighter than aluminum with similar strength or tensile properties. In some embodiments, carbon fiber material may include a plurality of carbon strands that are orientated in a parallel direction. In some embodiments, carbon fiber material may include a plurality of carbon strands that are woven together such that the carbon strands interlace at right angles to one another. Stitched resin infused carbon fiber cloth may be a pliable material. Alternatively, stitched resin infused carbon fiber cloth may be a non-pliable material. In one or more embodiments, carbon fiber material may include any carbon fiber material as described in U.S. Nonprovisional patent application Ser. No. 18/117,145, filed on Mar. 3, 2023, and titled "AIRCRAFT WITH CARBON FIBER MATERIAL AND A METHOD OF MANUFACTURE", the entirety of which is incorporated by reference herein.

In one or more embodiments, carbon fiber material may include one or more dry carbon fiber sheets. A "carbon fiber sheet" for the purposes of this disclosure is one or more layers of a carbon fiber material that are stacked upon each other. For example, carbon fiber sheet may include multiple layers wherein each layer includes carbon fiber strands, portions of carbon fiber strands, composites comprising carbon fiber strands and the like. In one or more embodiments, carbon fiber sheet may include one or more layers, wherein each layer may include a plurality of carbon fiber strands. In one or more embodiments, the one or more dry carbon fiber sheets may be stitched together. In one or more embodiments, each layer may include a thin sheet of carbon fiber material, bundles of carbon fibers, a sheet consisting of woven carbon fiber strands, a sheet carbon fiber strands bound together with an adhesive such as a glue, epoxy and/or stitching and any other variation of carbon fiber material. In one or more embodiments, carbon fiber material may include first dry carbon fiber sheet. First dry carbon fiber sheet may be consistent with carbon fiber sheet. The carbon fiber strands within first dry carbon fiber sheet may be spooled using carbon fibers. In one or more embodiments, each layer may include a composite material. In one or more embodiment, carbon fiber sheet may contain one or more layers, wherein each layer includes a plurality of carbon fibers. In one or more embodiments, each layer may include a plurality of dry carbon fibers. "Dry carbon fiber," for the purposes of this disclosure, is carbon fiber that has not been coated or impregnated with resin. In one or more embodiments, layers within carbon fiber sheet may contain differing materials, orientations and the like. For example, a top layer may contain a plurality of carbon fiber strands orientated in a first direction and a middle layer may contain a plurality of carbon fiber strands orientated in a differing second direction. In one or more embodiments, the top layer may include a composite material and/or a differing material as the middle layer. In one or more embodiments, carbon fiber sheet may include a quasi-isotropic layup. A "quasi-isotropic layup" as described in this disclosure is when the orientation of the one or more layers are balanced such that there is a constant strength and stiffness of the carbon fiber sheet regardless of the direction in which a force is applied. For example, carbon fiber sheet may include four layers oriented at angles of 0°/−45°/+45°/90°, wherein the orientation of angles provides for a similar strength in multiple directions.

With continued reference to FIG. 7, in one or more embodiments, first dry carbon fiber sheet may include a thickness. The thickness may be defined as a result of multiple layers stacked upon one another. For example, a thickness of a top layer and a thickness of a middle layer may provide for an overall thickness of first dry carbon fiber sheet. The first dry carbon fiber sheet may include multiple layers laid onto of one another wherein the combination of the multiple layers may result in a resulting overall thickness. For example, the first dry carbon fiber sheet may include 10 layers wherein each layer may include a thickness of 0.001 inches wherein the combination of layers may result in a carbon fiber sheet consisting of 0.010 inches. In one or more embodiments, layers within carbon fiber material may contain differing thicknesses. For example, a top layer may contain a thickness of 0.001 inches whereas a second layer may consist of 0.002 inches. In one or more embodiments, the resulting thickness of the first dry carbon fiber sheet may include a resulting thickness of 0.007 inches and/or 2 millimeters. In one or more embodiments, the thickness of the first dry carbon fiber sheet may include an overall thickness ranging from 0.050 inches to 1 inch.

With continued reference to FIG. 7, the first dry carbon fiber sheet may include a first layer. The first layer may be consistent with any layer described in this disclosure. First layer may include a first plurality of dry carbon fibers positioned in a first direction. First plurality of dry carbon fibers may be consistent with any dry carbon fibers mentioned within this disclosure. In one or more embodiments, the first plurality of carbon fibers may include more than one carbon fiber strands oriented in a similar direction. For example a first strand within the first plurality of carbon fibers may be parallel to a second strand within first plurality of carbon fibers. In one or more embodiments, a first dry carbon fiber within first plurality of carbon fiber is situated non-parallel to a second dry carbon fiber of the first plurality of dry carbon fibers. In one or more embodiments, the first plurality of dry carbon fibers may be unidirectional wherein each fiber within the first plurality of carbon fibers are parallel to one another. "Unidirectional" for the purposes of this disclosure refers to a layer wherein each fiber within the layer run in a single parallel direction. In one or more embodiments, the first plurality of dry carbon fibers may be bidirectional. "Bidirectional" for the purposes of this disclosure refers to a layer wherein each fiber within the layer runs in either one of two directions. For example, one or more fibers within the first plurality of dry carbon fibers may be non-parallel to one or more fibers within first plurality of dry carbon fibers. In one or more embodiments, a first portion of dry carbon fibers within first plurality of dry carbon fibers may be orthogonal to a second portion of dry carbon fibers, wherein a portion is one or more dry carbon fiber. In one or more embodiments, first layer may include a woven material wherein a portion of dry carbon fibers within first plurality of dry carbon fibers may be interlaced as to form a fabric. In one or more embodiments, the portion of dry carbon fibers may be woven and/or interlaced orthogonally to a second portion of dry carbon fibers within first plurality of dry carbon fibers.

With continued reference to FIG. 7, the first dry carbon fiber sheet may include a second layer having a second plurality of dry carbon fibers positioned in a second direction. Second layer may be consistent with first layer. In one or more embodiments, the second layer may include a differing material in comparison to first layer, differing orientation of fibers in comparison to first layer, and the like. For example, the first plurality of dry carbon fibers may be bidirectional wherein second layer may be unidirectional. In one or more embodiments, the first layer may include a woven material whereas the second layer may contain a nonwoven material. In one or more embodiments, the second layer may contain a differing width, thickness, and length in comparison to the first layer. In one or more embodiments, a second plurality of dry carbon fibers may be oriented in a second direction wherein the second direction differs from the first direction. For example, the second plurality of dry carbon fibers may be oriented at a 90-degree angle whereas first plurality of dry carbon fibers may be oriented at a 0-degree angle. In one or more embodiments, first direction and second direction may be similar.

With continued reference to FIG. 7, second layer may be disposed on top of first layer. In one or more embodiments, second layer may be disposed on top of first layer such that a surface area of second layer is substantially in contact with first layer. In one or more embodiments, second layer may be disposed on top of first layer such that second layer is stacked upon first layer. In one or more embodiments, second layer may be stacked upon first layer such that the width of second layer and the width of first dry carbon fiber sheet may be substantially similar. In one or more embodiments, first layer, second layer and first dry carbon fiber sheet contain a substantially similar thickness. In one or more embodiments, a portion of second layer may be stacked upon a portion of first layer.

With continued reference to FIG. 7, first dry carbon fiber sheet and/or alternatively carbon fiber material may include more than two layers. For example, first carbon fibers sheet may include a third layer. In one or more embodiments, first dry carbon fiber sheet may include more than three layers. In one or more embodiments, first dry carbon fiber sheet may contain 10 or more layers wherein each layer may be consistent with first layer, second layer and any other layers described within this disclosure.

Figure 10:
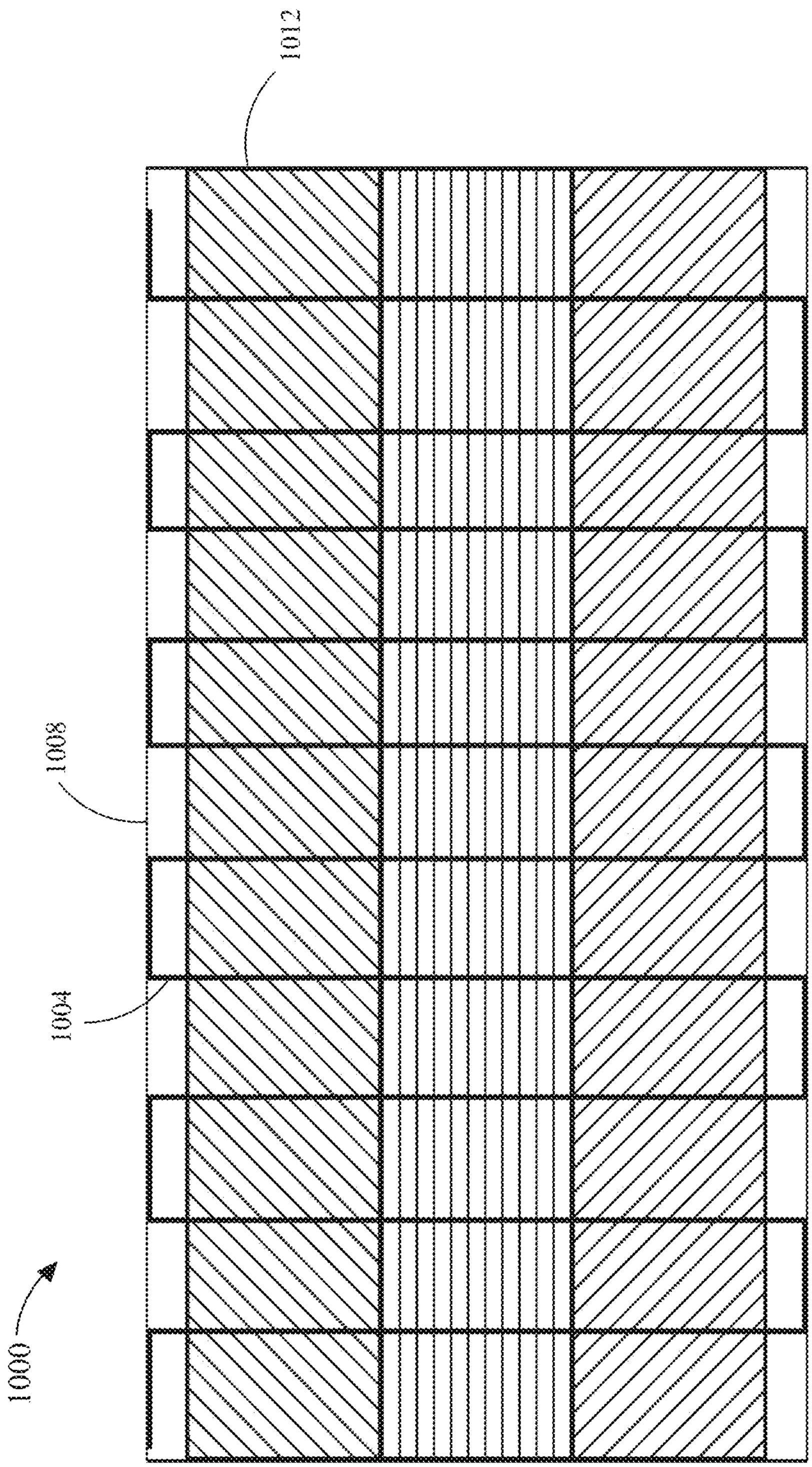
FIG. 10 is an exemplary embodiment of a carbon fiber material.

Referring now to FIG. 10, an exemplary embodiment of a carbon fiber material 1000 is illustrated. Carbon fiber material 1000 may contain at least one stitching 1004 extending through first dry carbon fiber sheet 1012. "Stitching" for the purposes of this disclosure refers to a material configured to extend through two or more materials and bind the two or more materials togethers. Stitching 1004 may include any thread that may be configured to bind two or more materials together. Stitching 1004 may include any material, such as but not limited to, carbon fiber, poly-fiber, polyester, Kevlar, aramid and/or a thermoplastic. In one or more embodiments, carbon fiber material 1000 may include multiple stitching 1004, wherein each stitching 1004 may include similar or differing materials. In one or more embodiments, stitching 1004 may include any material suitable for binding layers within first dry carbon fiber sheet 1012 together. In one or more embodiments, stitching 1004 is configured to bind first dry carbon fiber sheet 1012 together such that layers within first dry carbon fiber sheet 1012 are bound to one another. In some embodiments, stitching 1004 may provide delamination resistance and improve damage tolerance of a composite material such as first dry carbon fiber sheet 1012. In one or more embodiments, stitching 1004 may extend through first dry carbon fiber sheet 1012 wherein stitching 1004 extends through the thickness of each layer of first dry carbon fiber sheet 1012. In one or more embodiments, stitching 1004 may provide for through-thickness reinforcement. In one or more embodiments, the through thickness reinforcement may prevent delamination and/or contain delamination within a particular area. In one or more embodiments, stitching 1004 may contain delamination within a particular area, wherein a composite material such as first dry carbon fiber sheet 1012 may not delaminate past a stitching 1004. In one or more embodiments, delamination may occur wherein a carbon fiber material such as first dry carbon fiber sheet 1012 is bonded to a structure.

With continued reference to FIG. 10, the effect of stitching 1004 on first dry carbon fiber sheet 1012 may be affected by parameters such as the stitch density, the stitch material, the thread density and the like. Stitch density as described in this disclosure refers to the number of stitches over a given area. A higher stitch density may minimize possibilities of delamination within first dry carbon fiber sheet 1012. "Thread density" as described herein refers to the density of the thread used for stitching 1004. In one or more embodiments, stitching 1004 may be sown into first dry carbon fiber sheet 1012 such that layers within first dry carbon fiber sheet 1012 are bound together. In one or more embodiments, the stitching 1004 extending through the first dry carbon fiber sheet 1012 includes a stitching 1004 style such a lock stitch or a modified lock stitch. A "lock stitch" for the purposes of this disclosure is a type of stitching process used in which two threads penetrate a material and interlock primarily within the material. A "modified lock stitch" for the purposes of this disclosure is stitching process in which two threads on opposing surfaces of a material interlock at one surface of the material. In a lock stitch, a top thread and a bottom thread penetrate a material and interlock within the material (ideally within the center of the material) thereby binding the material. In a modified lock stitch, the top thread and bottom thread interlock with each other at an edge of the material, such as at the top or at the bottom of the material.

In one or more embodiments, a lock stitch and/or a modified lock stitch may prevent unraveling of a stitching 1004 within first dry carbon fiber sheet 1012. For example, a rip or unraveling of a stitching 1004 within a particular area of first dry carbon fiber sheet 1012 may be contained as the locks created by the interlocking of the top thread and bottom thread prevent the rip or unraveling of the stitching 1004 from spreading. In both lock stitching 1004 and modified lock stitching 1004 a needle penetrates a first thread through the material and a hook catches the first thread and loops it around a second thread. The hook is sometimes referred to as the bobbin. In a modified lock stitch, the tension of the needle and/or the hook is decreased such that the threads interlock at an edge and/or surface of the material. In both a lock stitch and a modified lock stitch the needle thread and the bobbin thread must enter at opposite sides of the material such as opposite sides of first dry carbon fiber sheet 1012. In one or more embodiments, a modified lock stitch may provide for increased bonding strength of a material. In one or more embodiments, the stitching 1004 extending through the first dry carbon fiber sheet 1012 may include a stitching 1004 style such as tufting. "Tufting" for the purposes of this disclosure is the process of stitching a material through a primary surface in the form of a loop. A tufting process may include inserting a thread through a first surface of a material, looped within the first material or an opposing surface of the material and back through the first surface of the material. In tufting, a loop of the thread is typically left on an opposing surface of the material. Tufting may be contrasted with a lock stitch or a modified lock stitch in that tufting requires only requires a single thread penetrating only one side of the material. In tufting the loops created by the thread are not interlocked and instead remain in place due to friction between the thread and the material. In one or more embodiments, stitching 1004 may be partially inserted into first dry carbon fiber sheet 1012 wherein stitching 1004 is looped within first dry carbon fiber sheet 1012 and returned to the surface. In one or more embodiments, stitching 1004 may be completely inserted into first dry carbon fiber sheet 1012 wherein stitching 1004 is inserted through one surface and looped on an opposing surface prior to returning through the inserting surface. In one or more embodiments, stitching 1004 may extend through first dry carbon fiber sheet 1012 using a tufting needle wherein the tufting needle is configured to insert stitching 1004 through an inserting surface and loop the stitching 1004 within first dry carbon fiber sheet 1012. In one or more embodiments, stitching 1004 may be inserted orthogonally to a surface of first dry carbon fiber sheet 1012. In one or more embodiments, stitching 1004 may be inserted non-parallel to first dry carbon fiber sheet 1012. In one or more embodiments, stitching 1004 may be inserted into first dry carbon fiber sheet 1012 at a 45-degree angle.

With continued reference to FIG. 10, carbon fiber material 1000 further includes a resin matrix 1008, wherein the stitching 1004 and the first dry carbon fiber sheet 1012 are embedded within the resin matrix 1008 to create a single unified structure. "Resin" as described in this disclosure is a compound consisting of a non-crystalline or viscous liquid substance. Resin may be reacted with a curing agent or a hardener in order to create a solid material. In some embodiments, resin may include vinylester resins, epoxy resins or any other lightweight resins with durability suitable for aircraft. "Matrix" for the purposes of this disclosure is a material in which a reinforcement material is embedded into such that the matrix binds the reinforcement material and provides the reinforcement material with a defined shape. "Resin matrix" for the purposes of this disclosure is a containing resin wherein reinforcement material is embedded into the resin. In one or more embodiments, resin matrix 1008 may include a resin wherein a reinforcement material such as the first dry carbon fiber cloth, along with the stitching 1004 are embedded into resin matrix 1008 to bind the first dry carbon fiber cloth and the stitching 1004 to provide a shape. Resin matrix 1008 may include any resin and/or resin matrix 1008 as described within this disclosure. Resin may be a liquid that is poured and used to create a shape. Resin may then be cured to maintain a desired shape. Resin may be poured over first dry carbon sheet such that first dry carbon fiber sheet 1012 along with the stitching 1004 is embedded into a layer of resin. Resin may provide for reinforcement of first dry carbon fiber sheet 1012 and ensure that carbon fibers within first dry carbon fiber sheet 1012 do not change orientation. In one or more embodiments, first dry carbon fiber sheet 1012, stitching 1004, and resin matrix 1008 may be combined to create a single unified structure. "A single unified structure" for the purposes of this disclosure is a part and/or component having multiple elements that are bound together to create a single product. Carbon fiber material 1000 may contain a single unified structure wherein elements of carbon fiber material 1000 cannot be easily interchanged and/or modified. In one or more embodiments, single unified structure may include a product wherein each element cannot be removed without destroying or damaging the structure. In one or more embodiments, single unified structure may include a product that contains multiple parts that all move in tandem with one another. In one or more embodiments, single unified structure may include a part wherein each element is dependent on at least another element within the part. In one or more embodiments, carbon fiber material 1000 may be a single unified structure wherein carbon fiber material 1000 is molded such that elements within the resin matrix 1008 are bound together. In this embodiment, resin matrix 1008 may be cured such that stitching 1004, and first dry carbon fiber sheet 1012 are bound within the resin matrix 1008. In one or more embodiments, carbon fiber material 1000 may include a molded part, wherein the molded part includes a composite created within a mold. In one or more embodiments, first dry carbon fiber sheet 1012, resin matrix 1008 and stitching 1004 may be placed within a mold and cured in order to create a molded part and/or carbon fiber material 1000.

With continued reference to FIG. 10, the resin matrix 1008 may be cured through a molding process. "Molding" as described herein refers to the formation of an object. In some embodiments, molding may include formation of an object using malleable material. Molding may include pouring resin into a mold to create a part. Molding may further include pouring resin into a mold and curing the mold. Molding may include a Resin Transfer Molding. Resin Transfer Molding as described is a closed molding process wherein resin is injected into a mold having a dry composite, first dry carbon fiber sheet 1012, and clamped together. Continuing, a vacuum is then applied to the mold to remove any air and ensure that the dry composite has been properly infused. In some embodiments, molding may include compression molding. Compression molding as described herein is process in which a molding material such as resin is placed into an open mold and compressed from an open end of the mold. In some embodiments, molding may include a Vacuum Infusion Process (VIP). In one or more embodiments, first dry carbon fiber sheet 1012 and stitching 1004 may be embedded into resin matrix 1008 using VIP. "Vacuum infusion process," as described herein, refers to a closed molding process in which resin is infused into a mold using a vacuum to draw the resin into the mold. VIP includes placing a dry composite, such as first dry carbon fiber sheet 1012 and stitching 1004, into a mold and infusing the sheets with a resin. In a vacuum infusion process, air pockets and any other voids are removed, and resin is drawn into the mold. In a vacuum infusion process, the dry composite is first placed into a mold and the resin is drawn into a mold such that the resin takes the form of the mold. In a vacuum infusion process, the dry composite may be compacted using a vacuum before the resin is drawn in. A vacuum infusion process may be preferred in materials that require a higher concentration of dry composites or reinforcement material in comparison to resin. In a vacuum infusion process voids may be minimized as air pockets are sucked out prior to the resin being drawn into the laminate.

Referring back to FIG. 7, in one or more embodiments, outer mold line skin 704 may provide in-plane strength and rigidity. In one or more embodiments, outer mold line skin 704 may add strength and rigidity to one or more structural elements connected to outer mold line skin 704. In one or more embodiments, outer mold line skin 704 may add strength and rigidity to resist longitudinal forces. In one or more embodiments, outer mold line skin 704 may provide shear strength and rigidity to aircraft structure 700. In one or more embodiments, outer mold line skin 704 may aid torsional strength and rigidity to an overall center body structure of an aircraft. In one or more embodiments, outer mold line skin 704 may provide mechanical protection of internal components, such as but not limited to hangar rash. In one or more embodiments, outer mold line skin 704 may provide protection of internal components from rain, hail, snow, ice, deicing spray and the like. In one or more embodiments, outer mold line skin 704 may provide protection from a mechanic walking on the upper outer mold line surface of aircraft. In one or more embodiments, outer mold line skin 704 may be impermeable wherein a fluid may not be able to pass through.

With continued reference to FIG. 7, in one or more embodiments, aircraft structure 700 includes one or more frames 716. In one or more embodiments, aircraft structure 700 may include two or more frames 716. "Frame" for the purposes of this disclosure is a structural component of an aircraft that is configured to provide structural support for one or more components of the aircraft. In one or more embodiments, frame 716 may be configured to beam compression loads to other structural components of the aircraft structure 700. In a semi-monocoque structure, frame 716 may be responsible for increasing the structural strength of the aircraft skin, or alternatively outer mold line skin 704, wherein loads generally placed on the aircraft skin may be placed on the frames 716 instead. In one or more embodiments, outer mold line skin 704 may subject to deformation in two directions: along its length and across its cross section. These unfavorable deformations may be resisted by additional structural elements intended to increase both the rigidity and strength of the skin. For example, the thin skin of tubular airliner fuselages may be reinforced by longitudinal "stringers" and circumferential "frames". The dimensions and materials of these elements are selected to provide sufficient additional strength and rigidity to avoid skin buckling and crippling. In the case of an aircraft not having a tubular fuselage, such as a BWB for example, secondary components such as stringers and frames 716 may play an additional role. Stringers and/or frames 716 may provide an efficient structural support system for the heavily pressurized upper and lower outer mold line skins 704. Outer mold line skin 704 may be supported at its perimeter by the leading edges and perimeter pressure bulkheads. Inner surface 712 of outer mold line skin 704 may be supported by one or more ribs that connect the upper and lower outer mold line skins 704. In one or more embodiments, an aircraft, such as any aircraft as described in this disclosure, may include ribs that extend vertically within a fuselage of the aircraft. In one or more embodiments, the ribs may be configured to prevent an upper surface and a lower surface of the aircraft from separating. In one or more embodiments, during a flight the ribs may be in tension. In one or more embodiments, the ribs may include structural components within a fuselage of the aircraft configured to prevent separation of a an upper and lower surface of the aircraft. In one or more embodiments, loads from other structural components of the aircraft may be transferred to ribs. In this way, outer mold line skin 704 may include one or more outer mold line skins 704 divided into large panels supported at their edges. Considerations in the structural design of these large panels include deflection and weight. Low deflection under pressure and light weight are favorable. One solution to the panel design may be to uniformly thicken the outer mold line skin 704 so that its strength and rigidity are increased. This may limit the outer mold line skin 704's deflection and stress to acceptable values. However, it may be that the required skin thickness results in a very heavy outer mold line skin 704 that is ill-suited for aircraft.

In one or more embodiments, frames 716 may be situated along the inner surface 712 of outer mold line skin 704 in order to provide structure to aircraft structure 700 and to minimize deflection of outer mold line skin 704. In one or more embodiments, frames 716 may be placed along a short dimension of outer mold line skin 704, such as in the direction of one wing to another wing of an aircraft. The direction from one wing in the direction of another wing may be referred to as the width, whereas the direction from an aft of the aircraft in a direction of the nose of an aircraft may be referred to as the length. In one or more embodiments, frames 716 may be spaced apart at a selected, approximately uniform distance. Each frame 716 may be provided with a favorable depth that increases both its strength and rigidity to acceptable levels at a substantially lighter weight. Given a selected spacing between the placement of each frame 716, a thin skin may tend to deflect in the manner of a membrane from the cabin pressure load. The resulting arched forms between the frames 716 may be disadvantageous as a transonic aircraft skin. The deflection of the skin may be further reduced by introducing, in this example, smaller longitudinal elements called "stringers". Because they span only across the frames 716 (as opposed to across a cabin bay), they may be smaller in cross section. Furthermore, they may be spaced more tightly than the frames 716. The combination of the frames 716 and stringers may then divide the skin into a quilt of relatively small panels. As a result, each of these panels may deflect less than they would without support.

In one or more embodiments, the load path of an aircraft may include air pressure; skin load distributed to frames 716 and stringers; stringer loads distributed to frames 716; frame 716 load carried to ribs; rib load carried to opposing skin-stringer-frame 716 system. Said another way: the skin (also referred to as outer mold line skin 704) may be loaded by differential air pressure, the stringers may be loaded by the skins, the frames 716 may be loaded by the skins and the stringers, and the ribs are loaded by the frames 716.

There may be an aspect of optimization of such a skin-stringer-frame 716 semi-monocoque structure. If the frames 716 are more widely spaced, they receive a greater load and must be stronger and more rigid. This may be accomplished with the use of a deeper frame 716 with a modest increase in efficiency (load/weight). On the other hand, stringer depth and weight may increase with increasing frame 716 spacing, offsetting any frame 716 benefit. The stringers may be more widely spaced, but this may result in greater skin deflection or the need for thicker, heavier skins. An optimum design may be approached by analysis, iteration, or testing. The approach described above assumes that frames 716 run across the width of aircraft structure 700 wherein width is described above. This approach may reduce frame 716 weight by reducing frame 716 span. Stringers, in contrast, span only between frames 716. Their sizing may be insensitive to orientation relative to cabin dimensions. An effective semi-monocoque structural system for a non-tubular aircraft upper and lower skin may follow the skin-stringer-frame 716 arrangement described above. Furthermore, pressurized aircraft leading edges and pressure bulkheads may also follow this arrangement. Frames 716 must be relatively deep, whereas stringers may be less deep.

With continued reference to FIG. 7, one or more frames 716 may be located on an inner surface 712 of the outer mold line skin 704. In one or more embodiments, frame 716 may provide structural support to aircraft structure 700 and/or outer mold line skin 704. In one or more embodiments, frame 716 may reduce loads applied to outer mold line skin 704 in comparison to monocoque structures. In one or more embodiments, frames 716 may be placed along a width of aircraft structure 700 wherein a length of frame 716 (wherein a length of frame 716 may denote a dimension of frame 716 having the largest measurement) may run between the wings of aircraft structure 700. In one or more embodiments, each frame 716 of one or more frames 716 may have a trapezoidal cross section. The base of the cross section may connect to the skin. The interior end of the frame 716 may be located at a favorable distance from the skin. In one or more embodiments, a base of frame 716 may be wider than an interior end. In one or more embodiments, the base may be approximately parallel to the interior end. In one or more embodiments, the trapezoidal shape may be selected to provide frame 716 with a selected and favorable draft angle.

In one or more embodiments, frame 716 includes an outer flange 720 adhered to an inner surface 712 of outer mold line skin 704. In one or more embodiments, a flange may provide a substantial fraction of a frame 716 moment of inertia to resist bending and flexure from cabin pressure and flight loads. In one or more embodiments, flange may include a beam. In one or more embodiments, the beam may be circular, rectangular, flat and the like. In one or more embodiments, flange may include a metal such as aluminum or aluminum alloy. In one or more embodiments, flange may include carbon fiber material, such as any carbon fiber material as described in this disclosure. In one or more embodiments, flange may include a thick material wherein the thick material may have enough rigidity in each flange that the flanges are stable in terms of crippling or buckling to the side.

With continued reference to FIG. 7, in one or more embodiments, outer flange 720 may be consistent with flange. In one or more embodiments, outer flange 720 may be adhered to or attached to an inner surface 712 of outer mold line skin 704 using any adhesive as described herein. In one or more embodiments, outer flange 720 may be stitched to inner surface 712 of outer mold line skin 704. In one or more embodiments, outer flange 720 may be located at the base of the cross section of frame 716, wherein the base is connected to the inner surface 712 of outer mold line skin 704.

With continued reference to FIG. 7, frame 716 may include an inner flange 724. Inner flange 724 may be consistent with aspects of outer flange 720. In one or more embodiments, a width W1 of outer flange 720 may be larger than a width W2 of inner flange 724. In one or more embodiments, inner flange 724 may contain a smaller length, width W2 or thickness in comparison to outer flange 720. In one or more embodiments, inner flange 724 may be located near a top of frame 716. In one or more embodiments, inner flange 724 may be located at or near an opposing end of base of frame 716 and/or near an opposing end of outer flange 720.

With continued reference to FIG. 7, frame 716 may include a core filler. "Core filler" for the purposes of this disclosure is a material that is configured to fill voids within a hollow structure. In one or more embodiments, frame 716 may define a void between outer flange 720 and inner flange 724 wherein the void may be filled through the addition of core filler. For example, and without limitation, void may refer to a space between outer flange 720 and inner flange 724. In one or more embodiments, core filler may be located between outer flange 720 and inner flange 724 wherein outer flange 720 and inner flange 724 are separated by core filler. In one or more embodiments, core filler may be configured to provide a separation between outer flange 720 and inner flange 724. In one or more embodiments, core filler may serve as a preform prior to a molding process wherein inner flange 724 and core filler may provide frame 716 with its shape. In one or more embodiments, core filler may include an any material that can be used to fill a void. This may include but is not limited to, plastics, carbon fiber materials, foam and the like. In one or more embodiments, core filler may include a pliable material wherein the pliable material may allow for deformation of frame 716 when a load is applied. In one or more embodiments, the pliable material may include a foam core. "Foam core" for the purposes of this disclosure is a porous material that is capable of deformation. For example, foam core may include but is not limited to polyurethane foam, polystyrene foam, polypropene, nylon, Acrylonitrile Butadiene Styrene (ABS), and the like. In one or more embodiments, core filler may include thermosets such as but not limited to polyester, silicone, melamine, epoxy and the like. In one or more embodiments, core filler may include thermoplastics, such as but not limited to, polypropylene, polycarbonate, polystyrene and the like. In one or more embodiments, core filler may include a resin that has been mixed within a blowing agent which causes evenly distributed gas bubbles throughout the resin. In one or more embodiments, core filler may include a honeycomb structure. "Honeycomb structure" for the purposes of this disclosure is structural material comprised of numerous, connected walls oriented approximately orthogonal to a laminate surface. A common wall configuration is hexagonal, giving an appearance similar to that of a honeycomb. In one or more embodiments, honeycomb structure may have the geometry of a honeycomb to allow for minimization of the amount of material used. In one or more embodiments, core filler may include a honeycomb structure wherein core filler may contain the minimum amount of material needed for structural rigidity within frame 716. In one or more embodiments, honeycomb structure may allow for heavy materials that contain stronger structural properties, wherein the amount of heavy material may be minimized to reduce weight. In one or more embodiments, honeycomb structure may be made of any materials as described in this disclosure. In one or more embodiments, core filler may include thermal insulating properties wherein the passage of heat through core filler may be reduced and/or minimal. In one or more embodiments, a material having thermal insulating properties may include polystyrene and/or plastic foam. In one or more embodiment, a material having thermal insulating properties may include a material having a thermal conductivity of below 0.1 Watts/meter*kelvin (W/m*K). In one or more embodiments, a material having thermal insulting properties may include a material having a thermal conductivity within the range of 0.02-0.04 W/m*K. In one or more embodiments, a material having a thermal insulating properties may include a material having a thermal conductivity of less than 0.03 W/m*K. In one or more embodiments, a material having thermal insulating properties contains a high resistance to heat flow wherein heat flow is minimized through the material. In one or more embodiments, core filler may be porous wherein air pockets within core filler may reduce the thermal conductivity of core filler. In one or more embodiments, core filler may contain thermal insulating properties wherein core filler contains a thermal conductivity of less than 0.04 W/m*K. in one or more embodiments, core filler may include a material resistant to moisture. In one or more embodiments, moisture within a material such as core filler may increase the thermal conductivity of a material due to the high thermal conductivity of liquids. In one or more embodiments, core filler may include a closed cell foam wherein the closed cell foam may be resistant to moisture. In one or more embodiments, a closed cell foam may further increase the strength of core filler. In one or more embodiments, core filler may contain thermal insulating properties wherein a material of core filler has been modified to reduce thermal conductivity. For example, core filler may be porous wherein the thermal conductivity of core filler may be lower than another material having a non-porous structure. In one or more embodiments, core filler may contain a thickness (wherein the thickness is defined as the distance between outer mold line skin 704 and inner mold line skin 728) wherein the thickness may provide for increased thermal insulating properties. In one or more embodiments, a material having increased thickness may result in a lower transfer of heat from one portion of the material to another. In one or more embodiments, core filler may insulate an outer surface of an aircraft from the main cabin of the aircraft. In one or more embodiments, core filler may minimize the transfer of heat between the temperatures surrounding the aircraft and the temperatures within the aircraft. In one or more embodiments, core filler may contain a plurality of air pockets wherein the air pockets prevent the transfer of heat through core filler. In one or more embodiments, core filler may minimize the transfer of heat in comparison to other materials such as carbon fiber, aluminum, aluminum alloys and the like. In one or more embodiments, core filler located within frame 716 may be referred to as first core filler.

In one or more embodiments, core filler may include a material that is impermeable to resin. This material may include any materials as described in this disclosure such as, but not limited to, thermosets and thermoplastics. During the resin infusion process, it may be important to exclude resin from within cavities such as those created by the core filler within frame 716. Core filler may be providing such impermeability by excluding resin from the core volume. In contrast, another common core material or structure such as the honeycomb structure may be open at its ends and tends to fill with resin during an infusion process.

In one or more embodiments, the base of frame 716 contains an outer flange 720. An interior end of frame 716 may further contain inner flange 724 wherein inner flange 724 and outer flange 720 may have differing material types and cross sections. In one or more embodiments, outer flange 720 and inner flange 724 may be separated by core filler wherein outer flange 720 may be situated at one end of core filler and inner flange 724 may be situated at an opposing end of core filler. In one or more embodiments, outer flange 720 and inner flange 724 are connected through core filler. In one or more embodiments, outer flange 720 and inner flange 724 are adhered to each other through core filler. In one or more embodiments, outer flange 720 may be adhered to one portion of core filler and inner flange 724 may be adhered to another portion of core filler. In one or more embodiments, outer flange 720 may be in contact with core filler and inner flange 724 may be in contact with core filler as well.

With continued reference to FIG. 7, outer flange 720, inner flange 724 and/or core filler may be joined by a web skin 732. "Web skin" for the purposes of this disclosure is a material that is configured to join outer flange 720 and inner flange 724. For example, web skin 732 may include a thin material that is adhered to outer flange 720 and inner flange 724 wherein outer flange 720 and inner flange 724 are connected by web skin 732. In one or more embodiments, web skin 732 may include an outer surface of frame 716. In one or more embodiments, web skin 732 may include a portion of outer surface of frame 716 wherein outer flange 720 may include the remaining outer surface of frame 716. In one or more embodiments, web skin 732 may transfer shear force between the outer flange 720 and inner flange 724 and prevent outer flange 720 and inner flange 724 from coming together or separating. In one or more embodiments, web skin 732 may be referred to as a "shear web" wherein the shear web is configured to transfer shea loads between the outer flange 720 and inner flanges 724 and prevent the outer flange 720 and inner flanges 724 from coming together or separating. In one or more embodiments, web skin 732 may include a thin material that acts as a skin for frame 716. In one or more embodiments, the material may include any carbon fiber material, aluminum, aluminum alloy and the like as described in this disclosure. In one or more embodiments, web skin 732 may contain a non-planar surface wherein portions of web skins 732 may contain curvature. In one or more embodiments, web skin 732 may take the form of an arch, a u-bend, a semicircle and the like. In one or more embodiments, web skin 732 may encapsulate inner flange 724 and at least a portion of core filler. In one or more embodiments, web skin 732 may include an arc 736 that is created by the non-planar surface. In one or more embodiments, inner flange 724 may be located on an interior of web skin 732 within the arc 736. In one or more embodiments, inner flange 724 may be located with an interior of web skin 732 within the arc 736 wherein core filler may be situated between inner flange 724 and an opening end 740 of web skin 732. In one or more embodiments, end points 744 of web skin 732 may be connected to outer flange 720. In one or more embodiments, end points 744 of web skin 732 may be connected to outer flange 720 wherein inner flange 724 and core filler and substantially encapsulated within outer flange 720 and web skin 732. In one or more embodiments, end points 744 of web skin 732 may be curved such that a portion of the web skin 732 surface may be adhered to a surface of outer flange 720. In one or more embodiments, a portion of web skin may be adhered to and/or attached to outer flange wherein an increase a portion of a surface area of web skin located near end points 744 of web skin 732 may be adhered to outer flange 720. In one or more embodiments, a portion of web skin 732 may be adhered to outer flange 720 wherein a portion of web skin is stitched to outer flange 720 In one or more embodiments, end points 744 of web skin 732 may contain a curvature to allow for increased surface area contact between web skin 732 and outer flange. In one or more embodiments, an increase in surface area contact between web skin 732 and outer flange may allow for forces to be distributed to a larger portion of web skin. In one or more embodiments, an increase in surface area contact may allow for minimization of a risk of detachment of web skin 732 from outer flange 720. In one or more embodiments, the combination of outer flange 720 and web skin 732 may create a trapezoidal shape wherein a large base of the trapezoid includes the outer flange 720 and the two legs, and the shorter base are made by the web skin 732. In one or more embodiments, the legs of the trapezoid may be longer in length than the short base and the long base. In one or more embodiments, web skin 732 may include sheet that has been formed into a trapezoidal shape. The trapezoidal shape may be selected to provide frame 716 with a selected and favorable draft angle. This may permit frame 716 to be inserted into a mold prior to a molding process. Furthermore, the draft may permit the cured and rigid frame 716 to be removed from a mold afterwards. Flat sides on the trapezoidal shape created by the web skin 732 and frame 716 may be favorable because it may result in crushing buckling loads on the web skin 732 to be resisted without generating side loads that may lead to delamination or core crushing. In contrast, a convex curved face may result in a compression load tending to buckle the skin away from the core. In one or more embodiments, outer flange 720, inner flange 724, and/or core filler may be connected to and/or adhered to web skin 732. In one or more embodiments, the combination of the core's rigidity (wherein the core includes at least the inner flange 724 and the core filler) and its connection to the web skin 732 serves to stabilize the web skin 732 from out-of-plane deflection. This enables the web skin 732 to resist buckling and wrinkling that may occur in the absence of the stabilizing core. In one or more embodiments, web skin 732 may be stitched to outer flange 720 wherein the ends of web skin 732 may be stretched to outer flange 720 to define a hollow cavity between web skin 732 and outer flange 720. In one or more embodiments, stitching may improve damage tolerance and crack propagation between the outer flange 720 and web skin 732. The hollow cavity may be filled with inner flange 724 and core filler. In one or more embodiments, each end of web skin 732 may be stitched to a surface of outer flange 720. In one or more embodiments, outer flange 720 may contain a planar surface wherein both ends of web skin 732 may be adhered to and/or stitched to the planar surface. In one or more embodiments, web skin 732 may be configured to provide sheer strength and rigidity wherein outer flange 720 and inner flange 724 are differentially loaded. In one or more embodiments, web skin 732 may be configured to transfer loads between outer flange 720 and inner flange 724. In one or more embodiments, web skin 732 may provide resistance to prevent crushing between outer flange 720 and inner flange 724 when a load is applied to frame 716. In one or more embodiments, web skin 732 may stabilize inner flange 724 from lateral movement resulting from compression loads on outer flange 720 or inner flange 724. In one or more embodiments, inner flange 724 may include other structural elements to prevent lateral movement such as any structural elements as described in this disclosure. In one or more embodiments, cabin loads may result in differential loads on inner flange 724 and outer flange 720 flanges. That is, one may be in compression and the other in tension, or vice-versa. In one or more embodiments, flight loads may load both flanges in the same direction. For example, the outer surface of an outer mold line of an aircraft center body may be loaded generally in compression from wing flight loads. In one or more embodiments, web skin 732 may include a portion of an inner mold line of aircraft structure 700. "Inner mold line" for the purposes of this disclosure is the boundary that separates the interior of an aircraft's structure with the exterior of the aircraft's structure. For example, outer mold line may encapsulate an outer surface of aircraft, whereas inner mold line may encapsulate an interior or aircraft. In one or more embodiments, inner mold line may denote the interior space in which passengers, cargo, fuel, and the like may be situated. In one or more embodiments, outer mold line and inner mold line may be separated by structural element such as stringers, frames 716, ribs and the like. In one or more embodiments, inner mold line and outer mold line may be connected through the structural elements described in this disclosure. In one or more embodiments, outer mold line may encapsulate the outer structure of an aircraft whereas inner mold line may encapsulate the inner structure of aircraft. In one or more embodiments, inner mold line skin may carry loads from an interior of an aircraft and transfer them to one or more structural elements within aircraft structure 700. In one or more embodiments, web skin 732 may include a portion of outer mold line wherein an outer surface of web skin 732 may include a portion of inner mold line. In one or more embodiments, core filler may prevent buckling of frame 716 and/or web skin 732 under loads. In one or more embodiments, non-planar surfaces may be prone to buckling under pressure loads. In one or more embodiments, core filler may be configured to prevent buckling of web skin 732 by providing a shape to web skin 732 and allow for deformation and subsequent reformation of a shape of web skin 732. In one or more embodiments, web skin 732 may include a carbon fiber material such as any carbon fiber material as described in this disclosure.

With continued reference to FIG. 7, in one or more embodiments, aircraft structure 700 includes an arched inner mold line skin 748. "Inner mold line skin" for the purposes of this disclosure is a material that is configured to encapsulate an interior structure of an aircraft. For example, inner mold line skin may include carbon fiber material that separates frames 716, outer mold line and the like from an interior of aircraft structure 700. In one or more embodiments, inner mold line skin may carry a load from an interior of an aircraft onto frames 716. For example, inner mold line skin may carry a load from cabin pressure within a fuselage of the aircraft onto frames 716. In one or more embodiments, a pressure difference between an interior of an aircraft and an exterior of an aircraft may cause a load to be applied onto aircraft structure 700. In one or more embodiments, inner mold line skin may carry the loads applied and transfer them to structural elements of aircraft structure 700. In one or more embodiments, inner mold line skin may be made of a carbon fiber material such as any carbon fiber material as described in this disclosure. In one or more embodiments, inner mold line skin may be made of a similar or differing materials as of outer mold line skin 704. In one or more embodiments, inner mold line skin may be deflected when a load is applied onto inner mold line skin. In one or more embodiments, deflection of inner mold line skin may result in forces being transferred to other components of aircraft structure 700, such as for example, frames 716. In one or more embodiments, inner mold line may include more than one inner mold line skins. In one or more embodiments, inner mold line may include a combination of web skins 732 and inner mold line skins. In one or more embodiments, inner mold line skin may include arched inner mold line skin 748. "Arched inner mold line skin" for the purposes of this disclosure includes an inner mold line skin having a non-planar surface. In one or more embodiments, arched inner mold line skin 748 may be consistent within inner mold line skin. In one or more embodiments, arched inner mold line skin 748 may include a circular cross section. In one or more embodiments, arched inner mold line skin may include the shape of an arch or an arc. In one or more embodiments, arched inner mold line skin 748 may include an arc shape wherein arched inner mold line includes a portion of a circle. In one or more embodiments, arc shape may include a smooth curve. In one or more embodiments, arc shape may include a portion of a circumference of a circle. In one or more embodiments, arched inner mold line skin 748 may provide a favorable level of deflection based on the selected material, the thickness of the materials, the radius of the of the circular cross section and the like. In one or more embodiments, the deflection of outer mold line skin 704 may be controlled through the selection of particular materials, through the selection of particular radius lengths and the like. In one or more embodiments, inner mold line skin may be located between two or more frames 716. In one or more embodiments, inner mold line skin may be situated between two or more web skins 732 of two or more frames 716. In one or more embodiments, an end 754 of inner mold line skin may be situated at or near an end of web skin 732. In one or more embodiments, an end 754 of arched inner mold line skin 748 may be attached to an/or adhered to an end point 744 of web skin 732. In one or more embodiments, end 754 of arched inner mold line skin 748 may contain a differing curvature than that of arched inner mold line skin 748. In one or more embodiments, end 754 of arched inner mold line skin 748 may contain a hook shape, a partial loop shape and/or any other shape with curvature. In one or more embodiments, end 754 may be situated above or below end point 744 of web skin. In one or more embodiments, the shape of end 754 may allow for increased surface contact between end 754 of arched inner mold line skin and endpoint 744 of web skin 732. In one or more embodiments, a portion at or near end 754 of arched inner mold line skin 748 and a portion near endpoints 744 of web skin 732 may overlap one another. In one or more embodiments, the overlapping of two portions may be referred to as a lap joint 760. In one or more embodiments, lap joint 760 may contain stitching and/or any adhesives in order to adhere a portion of web skin 732 to a portion of arched inner mold line skin 748. In one or more embodiments lap joint 760 may be configured to transfer loads applied onto arched inner mold line skin 748 onto frame 716. In one or more embodiments, arched inner mold line skin 748 may be connected to, adhered to, or stitched to a surface and/or an outer surface of web skin 732. In one or more embodiments, when a load is applied onto inner mold line skin, inner mold line skin may deflect and transmit the loads to frames 716 and/or web skins 732. In one or more embodiments, transmission of loads onto frames 716 may minimize the loads applied to outer mold line skin 704. In one or more embodiments, inner mold line skin may augment the strength of the inner flange 724 due to similar train levels applied to the outer mold line flange and inner mold line skin. In one or more embodiments, inner mold line skin may be substantially near and/or in contact with one or more frames 716. In one or more embodiments, inner mold line skin deflect when a load is applied on to inner mold line skin and transfer loads applied to inner mold line skin onto frames 716. In one or more embodiments, arched inner mold line skin 748 may be stitched to web skin 732. In one or more embodiments, inner mold line skin may be stitched to an inner surface 752 of web skin 732. In one or more embodiments, inner surface 750 of arched inner mold line skin 748 may be stitched to web skin 732. In one or more embodiments, arched inner mold line skin 748 may be connected to an inner surface 752 of web skin 732 in compression from cabin pressure loads wherein the cabin pressure loads are applied onto inner mold line skin. In one or more embodiments, during flight a pressure differential may exist due to the pressure difference between an interior of an aircraft (higher pressure) and the exterior of the aircraft (lower pressure). As a result, a load may be applied onto the inner mold line skin of the aircraft due to cabin pressure within a cabin of aircraft structure 700. In one or more embodiments, arched inner mold line skin 748 may be configured to deflect cabin pressure to one or more frames 716 wherein a force is applied on to inner mold line skin and the resulting force is transferred to one or more frames 716. In one or more embodiments, arched inner mold line skin 748 may be connected to frame 716 wherein a load applied onto outer flange 720 and inner flange 724 may be transferred into inner mold line skin. On one or more embodiments, arched inner mold line skin 748 may located between each frame 716 of one or more frames 716, wherein the arched inner mold line skin 748 is in contact with each web skin 732 of the two or more web skins 732.

With continued reference to FIG. 7, in one or more embodiments, inner surface 712 of outer mold line skin 704 may contain one or more frames 716 running along the inner surface 712 of outer mold line skin 704. In one or more embodiments, the frames 716 may be separated by a distance. In one or more embodiments, inner mold line skin may be situated between two frames 716. In one or more embodiments, inner mold line skin may be situated above planar surface of outer flange 720 wherein inner mold line skin is situated between outer flange 720 and inner flange 724. In one or more embodiments, inner mold line skin may be stitched to outer flange 720.

With continued reference to FIG. 7, core filler and/or a second core filler 730 (wherein second core filler 730 may be consistent with core filler) may be situated between an inner surface 712 of outer mold line skin 704 and inner mold line skin. In one or more embodiments, second core filler 730 may be located within a cavity created between inner mold line skin, frames 716 and inner surface 712 of outer mold line skin 704. In one or more embodiments, second core filler 730 may be situated between inner surface 712 of outer mold line skin 704 and inner surface 750 of arched inner mold line skin 748. In one or more embodiments, a distance may exist between one or more portions of arched inner mold line skin 748 and outer mold line skin 704. In one or more embodiments, inner surface of 750 arched inner mold line skin may be separated from inner surface 712 of outer mold line skin with second core filler 730. In one or more embodiments, a distance between arched inner mold line skin 748 and outer mold line skin 704 may define a cavity wherein the cavity contains second core filler 730. In one or more embodiments, second core filler may be attached to and/or adhered to inner surface 750 of inner mold line skin 748 and inner surface 712 of outer mold line skin 704. In one or more embodiments, core filler may prevent buckling of inner mold line skin resulting from cabin pressure loads. In one or more embodiments, buckling of inner mold line skin may occur under high carbon pressure loads, wherein a proper transfer of loads from inner mold line and frames 716 may not occur. In one or more embodiments, core filler may prevent or at least minimize the possibility of buckling resulting from cabin pressure loads. In one or more embodiments, core filler may serve as a preform to support arched inner mold line skin 748 during manufacturing of aircraft structure 700. In one or more embodiments, core filler may stabilize inner mold line skin against compression buckling and crippling. In one or more embodiments, core filler may stabilize outer mold line skin 704 against compression buckling and crippling. In one or more embodiments, core filler may be configured to provide a shape for inner mold line skin, outer mold line skin 704, and the like during a molding process. In one or more embodiments, core filler may connect an inner mold and line outer mold line of aircraft structure 700. In one or more embodiments, inner mold line skin and outer molder line skin may be adhered to core filler. In one or more embodiments, core filler may be sandwiched between inner mold line skin and outer mold line skin 704. In one or more embodiments, inner mold line skin may contain a thickness of material sufficient to prevent buckling without core filler. In one or more embodiments, a thicker inner mold line skin may reduce the thickness of outer flange 720 and inner flange 724, or the amount of material needed to create outer flange 720 and inner flange 724. In one or more embodiments, an end of inner mold line skin may be in contact with web skin 732. In one or more embodiments, a portion of a surface of inner mold line skin may be in contact with web skin 732. In one or more embodiments, inner mold line skin may contain curvatures and/or bumps located near the ends of inner mold line skin wherein the curvatures and/or pumps allow for increased surface contact between inner mold line skin and web skin 732. In one or more embodiments, ends of web skin 732 may further contain curvatures and/or bumps wherein the curvatures and/or bumps may allow for increased surface contact between web skin 732 and outer flange 720 and/or inner mold line skin.

In one or more embodiments, structural loads may be applied onto inner mold line skin and/or arched inner mold line skin 748. In one or more embodiments, pressure within a cabin of aircraft structure 700 may be contained by the inner mold line having the arched inner mold line skin 748 and the web skin 732. In one or more embodiments, the arched inner mold line skin 748 may resist pressure in pure compression according to the following equation:

$$\text{Stress} = (\text{Pressure} \times \text{Radius})/\text{Thickness}$$

Where stress is the compressive stress in arched inner mold line skin 748; pressure is the differential cabin pressure (inside to outside); radius is the radius of curvature of the arched inner mold line skin 148; and thickness is the skin thickness of the arched inner mold line skin 748. An example case illustrates the benefit of an arched inner mold line skin 748. Assume a maximum cabin differential pressure of 21 lb/in$^2$, an arch radius of 24 inches of arched inner mold line skin 748, and a thickness of 0.052 inches of arched inner mold line skin 748. This gives the result:

$$\text{Stress} = 21\ \text{lb/in}^2 \times 24\ \text{inches}/0.052\ \text{inches}$$

$$\text{Stress} = 9692\ \text{lb/in}^2$$

This stress value may be very low for a carbon-epoxy composite laminate. Force in the skin per running inch may be calculated according to the equation:

$$\text{Force/length} = \text{Stress} \times \text{Thickness}$$

Continuing the non-limiting example, the force per running inch equates to:

$$\text{Force/length} = 9692\ \text{lb/in2} \times 0.052\ \text{inch}$$

$$\text{Force/length} = 504\ \text{lb/inch}$$

This running load may be independent of arch thickness. The example shown in FIG. 7 may depict a lap joint 760 between the arched inner mold line skin 748 and web skin 732 that overlaps by about 1.86 inches. An approximate average joint load may be estimated as:

$$\text{Force/area} = (\text{Force/length})/(\text{joint overlap}) = \text{Force}/(\text{length} * \text{joint overlap})$$

Continuing the example, this gives an average joint load of:

$$\text{Force/area} = 504\ \text{lb/inch}/1.86\ \text{inch}$$

$$\text{Force/area} = 271\ \text{lb/in}^2$$

This value may be low for an integrally infused epoxy joint. The selected 21 lb/in$^2$ pressure level is experienced only once by airframe of an aircraft. Service pressure loads may be approximately 10 lb/in$^2$, yielding a loading of 129 lb/in$^2$. At this average loading, careful, detailed design of the joint may (well) enable such a joint to safely survive many loading cycles. An additional shear load may be imposed on this joint by strain in the frame 716 OML flange loading the arch skin.

With continued reference to FIG. 7, arched inner mold line skin 748 may deflect when pressure is applied and as a result transmit loads on to frames 716. As a result, changes of peel off from outer mold line skin 704 from aircraft structure 700 may be reduced due to the transfer of pressure from inner mold line to skin to frames 716. In one or more embodiments, the outer mold line skin 704 may be shielded from pressure loads by the arched inner mold line skin 748 and web skins 732. The resulting absence of pressure on the outer mold line skin 704 may strongly limit is propensity to peel outward from the support structure due to pressure loads. In one or more embodiments, because the arched inner mold skin shields the flat outer mold line skin 704 from cabin pressure loads, the outer mold line skin 704 may remain flat. The arched inner mold line skin 748 may be coupled to the outer mold line skin 704, so there may be some deflection from cabin pressure loads. However, the arched inner mold line skin 748 may deflect very little out of plane due to pressure loads, so the coupled deflection of the outer mold line skin 704 may be accordingly and favorably small.

With continued reference to FIG. 7, aircraft structure 700 may include one or more tear straps 756. "Tear strap," for the purposes of this disclosure, is a tension-only reinforcement that is configured to prevent rips or tears caused by tension within aircraft structure 700. In one or more embodiments, tear straps 756 may prevent rips and/or tears on outer mold line skin 704. In one or more embodiments, tear straps 756 may prevent rips and/or tears on any component of aircraft structure 700 as described in this disclosure. In one or more embodiments, tear straps 756 may be used to minimize tears such as by preventing the spreading of tears within one or more regions of the aircraft skin. In one or more embodiments, tear straps 756 may be additional to carbon fiber material. In one or more embodiments, tear straps 756 may run orthogonally to the length of frame 716. In one or more embodiments, adhesion of frame 716 to inner surface 712 of outer mold line skin 704 may provide reinforcement to outer mold line skin 704 in one direction, whereas tear straps 756 running orthogonal to frame 716 may provide reinforcement in an orthogonal direction. In one or more embodiments, tear straps 756 may run beneath frame 716 wherein tear strap 756 may be situated between inner surface 712 of outer mold line skin 704 and outer flange 720. In one or more embodiments, tear straps 756 may run between frames 716 wherein tear straps 756 may be placed orthogonal and between two frames 716. In one or more embodiments, tear straps 756 may limit propagation of a tear or other failure in the outer mold line skin 704, inner mold line skin, web skin 732 and the like. In some embodiments, tear strap 756 may operate in a manner similar to rip stop fibers such as lightweight nylon cloth. Tear straps 756 may provide a region of increased strength that reduces the stresses at a crack tip, for example and without limitation, to a level below the limit of the tear strap 756 material, thereby halting propagation. In one or more embodiments, tear strap 756 may include a carbon fiber material such as any carbon fiber material as described in this disclosure. in one or more embodiments, tear strap 756 may provide increased strength on various portions of inner mold line skin, outer mold line skin 704 and the like. In one or more embodiments, rips, cracks, or tears may be limited to regions bound by tear straps 756. In one or more embodiments, tear straps 756 may be stitched to inner mold line skin, outer mold line skin 704 and/or frames 716. In one or more embodiments, tear straps 756 may be adhered to various components of aircraft structure 700 through the use of epoxy, glue, nails, staples and the like.

Figure 8:
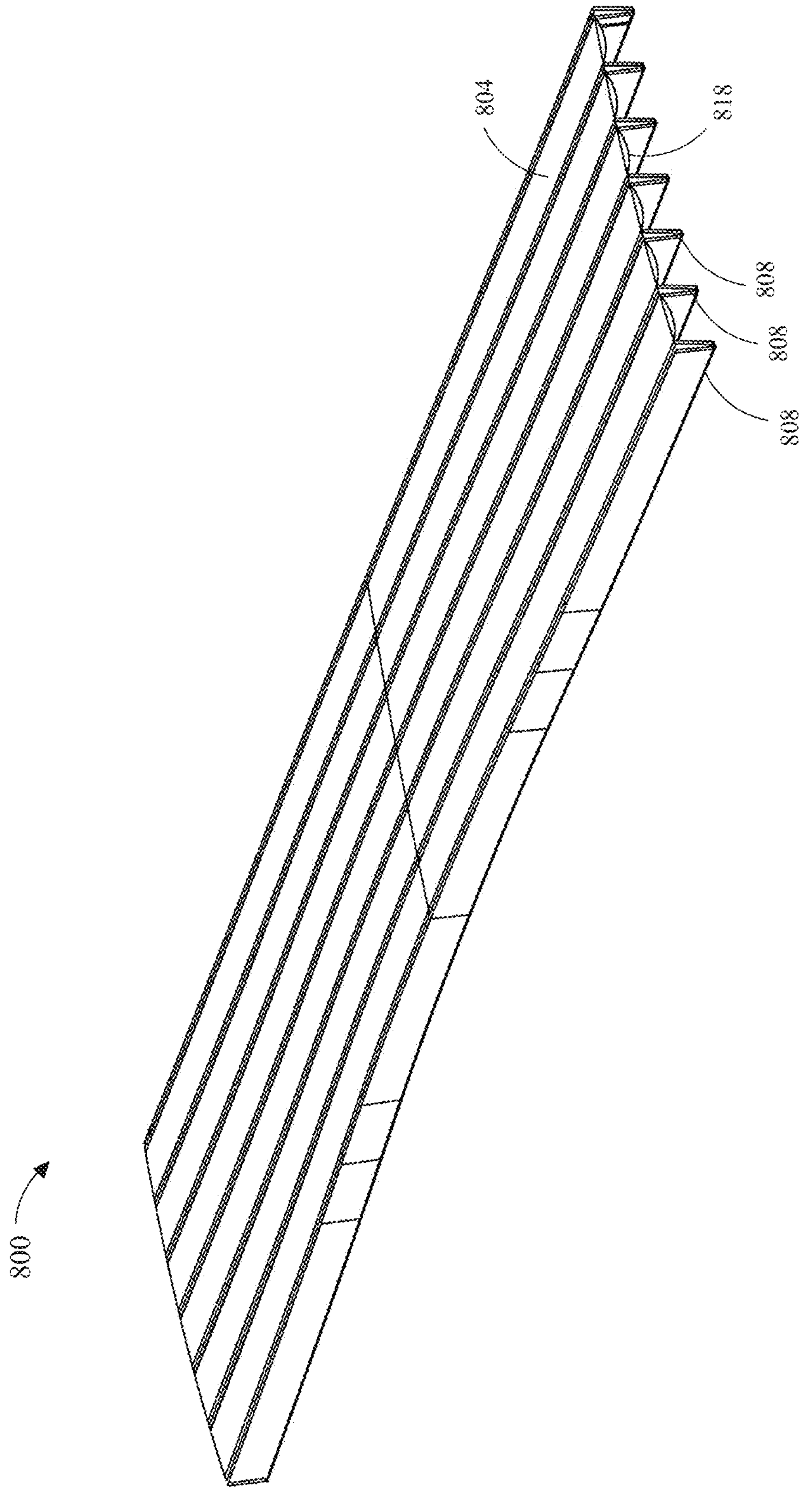
FIG. 8 is another exemplary embodiment of the aircraft structure according to the subject disclosure.

Referring now to FIG. 8, an exemplary embodiment of an aircraft structure 800 is described. In one or more embodiments, aircraft structure may include an outer mold line skin 804. In one or more embodiments, outer mold line skin 804 may include a single part. In one or more embodiments, outer mold line skin may include multiple parts that have been joined through adhesives, stitching and the like. in one or more embodiments, aircraft structure may include a plurality of frames 808. In one or more embodiments, frames 808 may be situated parallel to one another on aircraft structures. In one or more embodiments, frames 808 may run along a portion of an aircraft and provide stability to outer mold line skin 804. In one or more embodiments, each frame 808 may include an outer flange, an inner flange, a core filler, a web skin and the like as described in reference to FIG. 1. In one or more embodiments, inner mold line skin 818 may be situated between two frames 808. In one or more embodiments inner mold line skin may include an arched inner mold line skin wherein arched inner mold line skin contains a circular cross section. In one or more embodiments, inner mold line skin 818 transmits cabin pressure onto frames 808 In one or more embodiments transmission of carbon pressure on to frames 808 reduce the risk of peel off of outer mold line skin 804 from aircraft structure.

Figure 9:
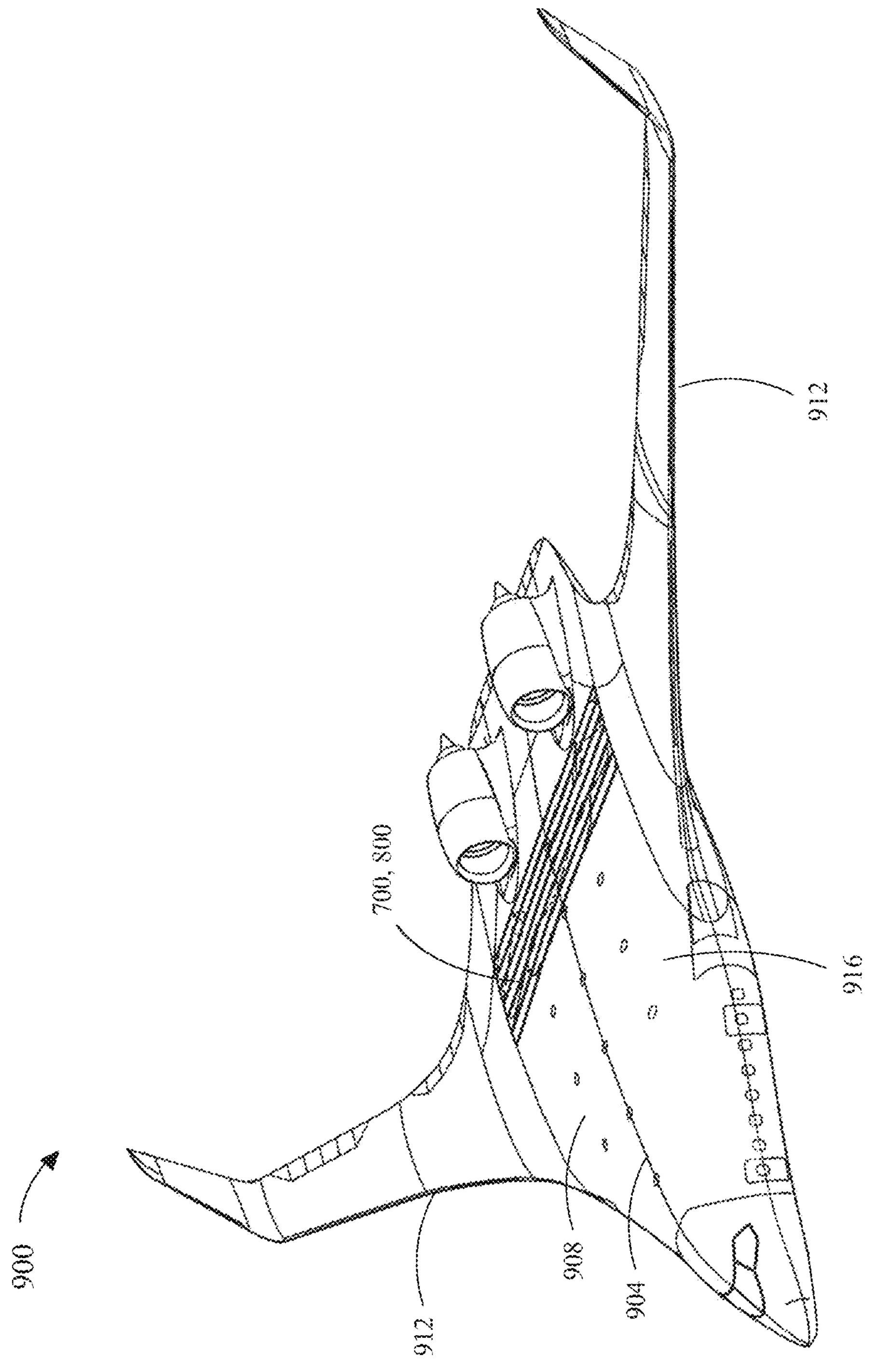
FIG. 9 is a schematic of an aircraft with the aircraft structure according to the subject disclosure.

Referring now to FIG. 9 an exemplary aircraft 900 having aircraft structure 700, 800 is described. In one or more embodiments, aircraft 900 may include a blended wing body aircraft. Blended wing body aircraft may be described in further detail below such as in reference to FIG. 5. In one or more embodiments, aircraft may include a main body 904. In one or more embodiments, main body 904 may include a fuselage of aircraft 900 wherein passenger and/or cargo may be located. In one or more embodiments, main body 904 may contain a planar surface wherein a portion of outer mold line 908 may contain a planar surface. In contrast, to tube and wing aircraft, outer mold line may contain one or more planar surfaces. In one or more embodiments, aircraft structure 700, 800 may be located on one or more planar surface of aircraft 900. In one or more embodiments, aircraft 900 may contain planar surface on an upper surface and/or a lower surface of aircraft 900. In one or more embodiments, frames may run longitudinally from one wing 912 to another wing 912 of aircraft 900. In one or more embodiments, outer flange 120 and inner flange 120 may include long beams extending from a direction of a first wing 912 in a direction of a second wing 912. In one or more embodiments, aircraft structure 700,800 may be located in areas of aircraft that contain a substantially planar surface. In one or more embodiments, aircraft structure 700, 800 may prevent or minimize peeling of outer mold line skin 404 form aircraft structure 700, 800. In one or more embodiments, inner mold line skin 148 may transfer cabin pressure loads onto frames wherein cabin pressure loads may not be placed on outer mold line skin 404. In one or more embodiments, aircraft structure may be located on an upper surface 916 of aircraft 900. In one or more embodiments, upper surface 916 of aircraft 900 may include one or more planar surface wherein the one or more planar surfaces include surface with minimal curvature. In one or more embodiments, upper surface 916 of aircraft may contain a planar and/or substantially planar surface. In one or more embodiments, in contrast to a tube and wing body aircraft wherein the outer mold line of the tube and wing body aircraft is primarily circular, aircraft 900 may contain an outer mold line that may contain substantially flat portions. In one or more embodiments, aircraft 900 may contain flat edges within a cylindrical main body 904. In one or more embodiments, aircraft 900 may contain curved edges and flat edges that combine to make the main body 904 of aircraft 900. In one or more embodiments, unlike a tube and wing body aircraft, aircraft 900 may include portions of main body that are non-circular. In one or more embodiments, aircraft 900 may contain an oval and/or ellipse cross section, wherein the oval and/or ellipse cross section includes a small arc defining a curved portion on a minor axis and a large arc defining a portion on the major axis. In one or more embodiments, aircraft 900 may contain an ellipse shape wherein upper surface includes a portion of the large arc on the major axis. In one or more embodiments, substantially planar may include a large arc on a major axis of an ellipse. In one or more embodiments, substantially planar may include a large arc or a portion thereof in on a major axis on an ellipse. In one or more embodiments, aircraft structure 700,800 may be located on an upper or lower surface of aircraft 900 wherein aircraft structure 700,800 may be located on a large arc portion of a major axis of an ellipse. Ine one or more embodiments, aircraft 900 may contain a substantially ellipse shape about an axis wherein portions of the ellipse shape may contain varying curvatures, differing asymmetry and the like. In one or more embodiments, aircraft 900 may predominantly or substantially take the shape of an ellipse about an axis but may still allow for variations.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 5. Furthermore, there is no intention to be bound by any expressed or implied theory presented in this disclosure.

Figure 11:
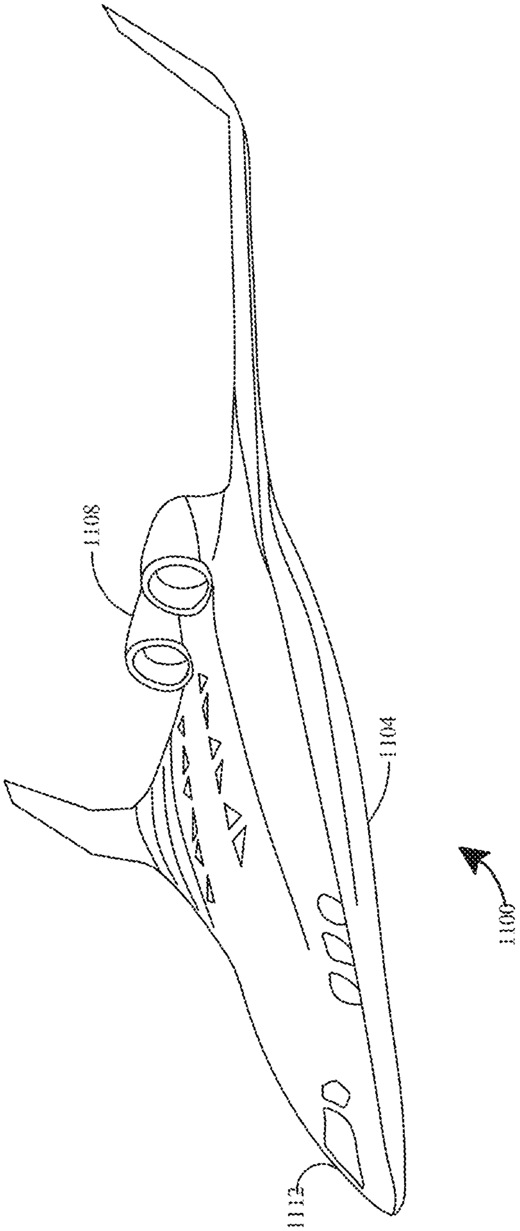
FIG. 11 is a schematic of an exemplary blended wing aircraft.

Referring to FIG. 11, an exemplary blended wing aircraft 1100 is illustrated. Aircraft 1100 may include a blended wing body 1104. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 1104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 1104 design may or may not be tailless. One potential advantage of a BWB 1104 may be to reduce wetted area and any accompanying drag associated with a conventional wing-body junction. In one or more embodiments, a BWB 1104 may also have a wide airfoil-shaped body, allowing entire aircraft to generate lift and thereby facilitate reduction in size and/or drag of wings. In one or more embodiments, a BWB 1104 may be understood as a hybrid shape that resembles a flying wing, but also incorporates features from conventional aircraft. In one or more embodiments, this combination may offer several advantages over conventional tube-and-wing airframes. In one or more embodiments, a BWB airframe 1104 may help to increase fuel economy and create larger payload (cargo or passenger) volumes within the BWB. BWB 1104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

1100 may include a nose portion. A "nose portion," for the purposes of this disclosure, refers to any portion of aircraft 1100 forward of the aircraft's fuselage 1112. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 11, BWB 1104 may include at least a structural component of aircraft 1100. Structural components may provide physical stability during an entirety of an aircraft's 1100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In one or more embodiments, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 1100 structure, they may be so named A, B, C, and so on named from nose to tail. Pillars, like any structural element, may be disposed a distance away from each other, along an exterior of aircraft 1100 and BWB 1104. Depending on manufacturing method of BWB 1104, pillars may be integral to frame and skin, comprised entirely of internal framing, or alternatively, may be only integral to structural skin elements. Structural skin will be discussed in greater detail below.

With continued reference to FIG. 11, BWB 1104 may include a plurality of materials, alone or in combination, in its construction. At least a BWB 1104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 1104 may comprise aluminum tubing mechanically coupled in various orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 1104 may additionally or alternatively use wood or another suitably strong yet light material for an internal structure.

With continued reference to FIG. 11, aircraft 1100 may include monocoque or semi-monocoque construction. BWB 1104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 11-10 micrometers and include a high percentage (i.e. above 811%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 11, BWB 1104 may include at least a fuselage. A "fuselage," for the purposes of this disclosure, refers to a main body of an aircraft 1100, or in other words, an entirety of the aircraft 1100 except for nose, wings, empennage, nacelles, and control surfaces. In one or more embodiments, fuselage may contains an aircraft's payload. At least a fuselage may comprise structural components that physically support a shape and structure of an aircraft 1100. Structural components may take a plurality of forms, alone or in combination with other types. Structural components vary depending on construction type of aircraft 1100 and specifically, fuselage. A fuselage 1112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 11, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 1100. In one or more embodiments, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 1100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 11, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 11, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In one or more embodiments, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 11, in one or more embodiments, a primary purpose for a substructure of a semi-monocoque structure is to stabilize a skin. Typically, aircraft structure is required to have a very light weight and as a result, in one or more embodiments, aircraft skin may be very thin. In one or more embodiments, unless supported, this thin skin structure may tend to buckle and/or cripple under compressive and/or shear loads. In one or more embodiments, underlying structure may be primarily configured to stabilize skins. For example, in an exemplary conventional airliner, wing structure is an airfoil-shaped box with truncated nose and aft triangle; without stabilizing substructure, in one or more embodiments, this box would buckle upper skin of the wing, and the upper skin would also collapse into the lower skin under bending loads. In one or more embodiments, deformations are prevented with ribs that support stringers which stabilize the skin. Fuselages are similar with bulkheads or frames, and stringers.

With continued reference to FIG. 11, in some embodiments, another common structural form is sandwich structure. As used in this disclosure, "sandwich structure" includes a skin structure having an inner and outer skin separated and stabilized by a core material. In one or more embodiments, sandwich structure may additionally include some number of ribs or frames. In one or more embodiments, sandwich structure may include metal, polymer, and/or composite. In one or more embodiments, core material may include honeycomb, foam plastic, and/or end-grain balsa wood. In one or more embodiments, sandwich structure can be popular on composite light airplanes, such as gliders and powered light planes. In one or more embodiments, sandwich structure may not use stringers, and sandwich structure may allow number of ribs or frames to be reduced, for instance in comparison with a semi-monocoque structure. In one or more embodiments, sandwich structure may be suitable for smaller, possibly unmanned, unpressurized blended wing body aircraft.

With continued reference to FIG. 11, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 1104. In one or more embodiments, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 11, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In one or more embodiments, a post may be supporting a floor (i.e., deck), or in other words a surface on which a passenger, operator, passenger, payload, or other object would rest on due to gravity when within an aircraft 1100 is in its level flight orientation or sitting on ground. A post may act similarly to stringer in that it is configured to support axial loads in compression due to a load being applied parallel to its axis due to, for example, a heavy object being placed on a floor of aircraft 1100. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 11, aircraft 1100 may include at least a flight component 1108. A flight component 1108 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 1100 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 1100. In some embodiments, at least a flight component 1108 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 11, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In one or more embodiments, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 11, at least a flight component may be one or more devices configured to affect aircraft's 1100 attitude. "Attitude", for the purposes of this disclosure, is the relative orientation of a body, in this case aircraft 1100, as compared to earth's surface or any other reference point and/or coordinate system. In one or more embodiments, attitude may be displayed to pilots, personnel, remote users, or one or more computing devices in an attitude indicator, such as without limitation a visual representation of a horizon and its relative orientation to aircraft 1100. A plurality of attitude datums may indicate one or more measurements relative to an aircraft's pitch, roll, yaw, or throttle compared to a relative starting point. One or more sensors may measure or detect an aircraft's 1100 attitude and establish one or more attitude datums. An "attitude datum", for the purposes of this disclosure, refers to at least an element of data identifying an attitude of an aircraft 1100.

With continued reference to FIG. 11, in one or more embodiments, aircraft 1100 may include one or more of an angle of attack sensor and a yaw sensor. In some embodiments, one or more of an angle of attack sensor and a yaw sensor may include a vane (e.g., wind vane). In one or more embodiments, vane may include a protrusion on a pivot with an aft tail. The protrusion may be configured to rotate about pivot to maintain zero tail angle of attack. In one or more embodiments, pivot may turn an electronic device that reports one or more of angle of attack and/or yaw, depending on, for example, orientation of the pivot and tail. Alternatively or additionally, in one or more embodiments, one or more of angle of attack sensor and/or yaw sensor may include a plurality of pressure ports located in selected locations, with pressure sensors located at each pressure port. In one or more embodiments, differential pressure between pressure ports can be used to estimate angle of attack and/or yaw.

With continued reference to FIG. 11, in one or more embodiments, aircraft 1100 may include at least a pilot control. As used in this disclosure, a "pilot control," is an interface device that allows an operator, human or machine, to control a flight component of an aircraft. Pilot control may be communicatively connected to any other component presented in aircraft 1100, the communicative connection may include redundant connections configured to safeguard against single-point failure. In one or more embodiments, a plurality of attitude datums may indicate a pilot's instruction to change heading and/or trim of an aircraft 1100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In one or more embodiments, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 1100. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 1108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In one or more embodiments, an aircraft command may be a function of a signal from a pilot control. In one or more embodiments, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In one or more embodiments, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 11, in some embodiments, pilot control may include at least a sensor. As used in this disclosure, a "sensor" is a device that detects a phenomenon. In one or more embodiments, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 1108. At least a flight component 1108 may include any propulsor as described herein. In embodiment, at least a flight component 1108 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 11, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 11, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 11, at least a flight component 1108 may include wings, empennages, nacelles, control surfaces, fuselages, and landing gear, among others, to name a few. In embodiments, an empennage may be disposed at the aftmost point of an aircraft body 1104. Empennage may comprise a tail of aircraft 1100, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 1100 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 1100 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 1104 aircraft 1100 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In one or more embodiments, wings may comprise controls surfaces configured to be commanded by a pilot and/or autopilot to change a wing's geometry and therefore its interaction with a fluid medium. Flight component 1108 may include control surfaces. Control surfaces may include without limitation flaps, ailerons, tabs, spoilers, and slats, among others. In one or more embodiments, control surfaces may be disposed on wings in a plurality of locations and arrangements. In one or more embodiments, control surfaces may be disposed at leading and/or trailing edges of wings, and may be configured to deflect up, down, forward, aft, or any combination thereof.

In one or more embodiments, flight component 1108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 1100. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in one or more embodiments, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 1100 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 11, aircraft 1100 may include an energy source. Energy source may include any device providing energy to at least a flight component 1108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In one or more embodiments, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 11, in further nonlimiting embodiments, an energy source may include a fuel store. As used in this disclosure, a "fuel store" is an aircraft component configured to store a fuel. In one or more embodiments, a fuel store may include a fuel tank. Fuel may include a liquid fuel, a gaseous fluid, a solid fuel, fluid fuel, a plasma fuel, and the like. As used in this disclosure, a "fuel" may include any substance that stores energy. Exemplary non-limiting fuels include hydrocarbon fuels, petroleum-based fuels., synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below, fuel store may be located substantially within blended wing body 1104 of aircraft 1100, for example without limitation within a wing portion of blended wing body 1104. Aviation fuels may include petroleum-based fuels, or petroleum and synthetic fuel blends, used to power aircraft 1100. In one or more embodiments, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In one or more embodiments, specific energy may be considered an important criterion in selecting fuel for an aircraft 1100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 11, modular aircraft 1100 may include an energy source which may include a fuel cell. As used in this disclosure, a "fuel cell" is an electrochemical device that combines a fuel and an oxidizing agent to create electricity. In one or more embodiments, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 11, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 11 second for proton-exchange membrane fuel cells (PEM fuel cells, or PEMFC) to 10 minutes for solid oxide fuel cells (SOFC). In one or more embodiments, energy source may include a related technology, such as flow batteries. Within a flow battery fuel can be regenerated by recharging. Individual fuel cells produce relatively small electrical potentials, about 0.7 volts. Therefore, in one or more embodiments, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In one or more embodiments, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 11, aircraft 1100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance, or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 11, aircraft 1100 may include multiple flight component 1108 sub-systems, each of which may have a separate energy source. For instance, and without limitation, one or more flight components 1108 may have a dedicated energy source. Alternatively, or additionally, a plurality of energy sources may each provide power to two or more flight components 1108, such as, without limitation, a "fore" energy source providing power to flight components located toward a front of an aircraft 1100, while an "aft" energy source provides power to flight components located toward a rear of the aircraft 1100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 11, aircraft 1100 may include a flight component 1108 that includes at least a nacelle. For the purposes of this disclosure, a "nacelle" is a streamlined body housing, which is sized according to that which is houses, such as without limitation an engine, a fuel store, or a flight component. When attached by a pylon entirely outside an airframe, a nacelle may sometimes be referred to as a pod, in which case an engine within the nacelle may be referred to as a podded engine. In one or more embodiments an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 1100 partially or wholly enveloped by an outer mold line of the aircraft 1100. At least a nacelle may be designed to be streamlined. At least a nacelle may be asymmetrical about a plane comprising the longitudinal axis of the engine and the yaw axis of modular aircraft 1100.

With continued reference to FIG. 11, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 11, a motor may be connected to a thrust element. Thrust element may include any device or component that converts mechanical work, for example a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 11, in nonlimiting embodiments, at least a flight component 1108 may include an airbreathing engine such as a jet engine, turbojet engine, turboshaft engine, ramjet engine, scramjet engine, hybrid propulsion system, turbofan engine, or the like. At least a flight component 1108 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in one or more embodiments, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In one or more embodiments, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In one or more embodiments, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In one or more embodiments, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In one or more embodiments, a majority of mass flow through an airbreathing jet engine may be provided by air taken from outside of the engine and heated internally, using energy stored in the form of fuel. In one or more embodiments, a jet engine may include are turbofans. Alternatively and/or additionally, jet engine may include a turbojets. In one or more embodiments, a turbofan may use a gas turbine engine core with high overall pressure ratio (e.g., 40:1) and high turbine entry temperature (e.g., about 1800 K) and provide thrust with a turbine-powered fan stage. In one or more embodiments, thrust may also be at least partially provided by way of pure exhaust thrust (as in a turbojet engine). In one or more embodiments, a turbofan may have a high efficiency, relative to a turbojet. In one or more embodiments, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 11, an aircraft 1100 may include a flight controller. As used in this disclosure, a "flight controller" is a device that generates signals for controlling at least a flight component 1108 of an aircraft 1100. In one or more embodiments, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 11, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system and/or computing device.

With continued reference to FIG. 11, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 12:
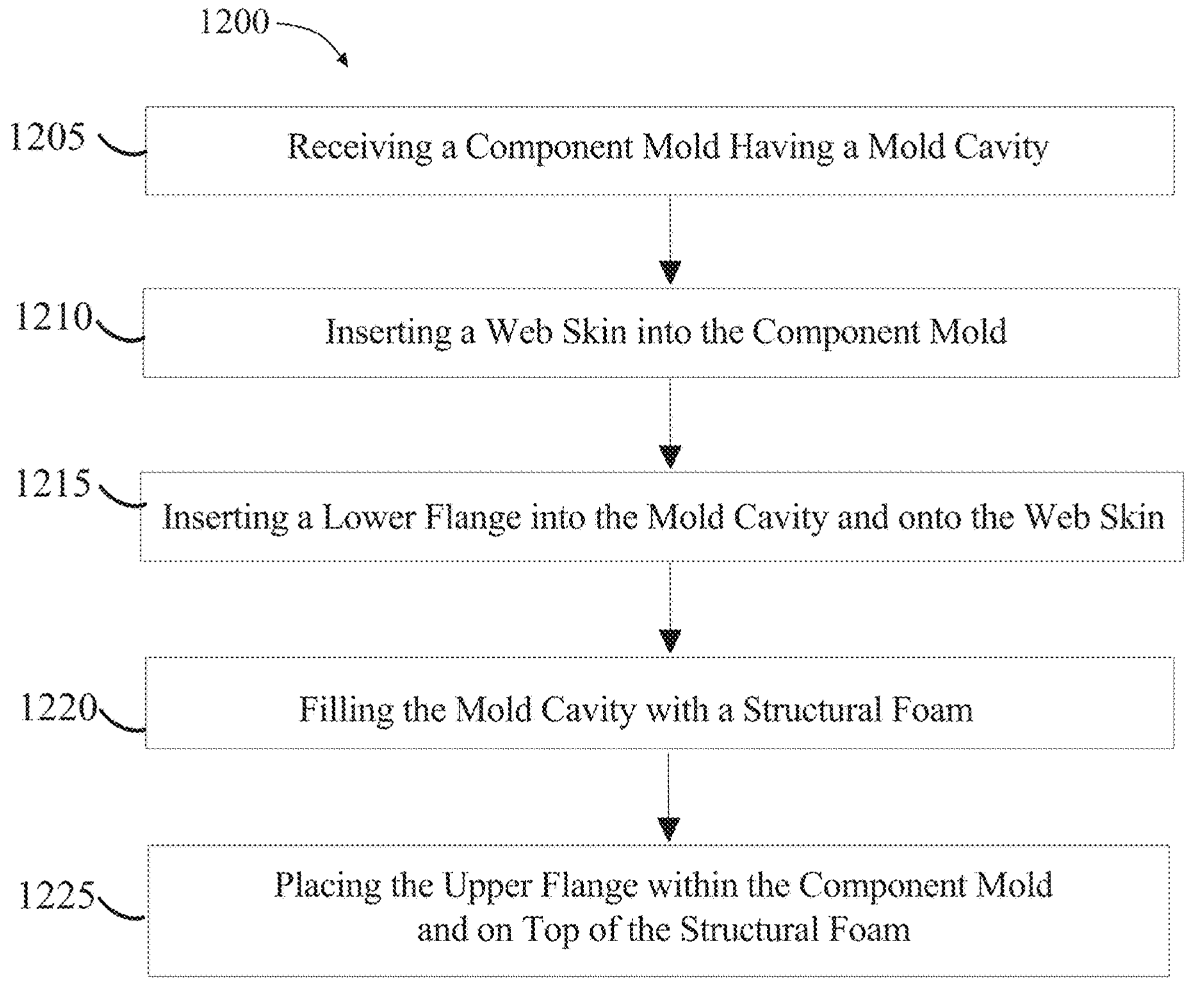
FIG. 12 is a flow diagram illustrating an exemplary embodiment of a method of manufacture of an aircraft component in accordance with the subject disclosure.

Referring now to FIG. 12, an exemplary embodiment of a method 1200 of manufacture for an aircraft component is described. At step 1205, Method 1200 includes receiving a component mold having a mold cavity. In one or more embodiments, the mold cavity may include a predominantly or substantially trapezoidal shape about a cross section. In one or more embodiments, mold cavity may include a substantially trapezoidal shape wherein mold cavity may contain a small base and two legs. In one or more embodiments, a surface of mold cavity may contain additional features such as bumps, grooves, indents and the like wherein mold cavity may not contain a complete trapezoidal shape. In one or more embodiments, the component mold contains a closed mold. In one or mor embodiments, the mold cavity includes one or more substantially planar surfaces. This may be implemented with reference to FIGS. 1-12 and without limitation.

With continued reference to FIG. 12, at step 1210, method 1200 includes inserting a web skin into component mold wherein web skin substantially blankets a surface of mold cavity. In one or more embodiments, web skin predominantly takes the shape of the surface of the mold cavity. In one or more embodiments, web skin substantially takes the shape of the surface of the mold cavity wherein web skin may take the shape or substantially take the shape of a surface of mold cavity. In one or more embodiments, web skin may substantially take the shape of the surface of the mold cavity wherein an outer surface of web skin and an outer surface of mold cavity may be the same or similar. In one or more embodiments, similarity may include similar draft angles, similar curves, bumps, edges and the like. In one or more embodiments, web skin may substantially take the shape of mold cavity wherein an outer surface of web skin may be similar to a portion of an outer surface of mold cavity. In one or more embodiments, similarity may include having the same shape with differing aspect ratios, having the same dimensions, having the same bumps, angles and the like. This may be implemented with reference to FIGS. 1-12 and without limitation.

With continued reference to FIG. 12, at step 1215 method 1200 includes inserting an inner flange into the mold cavity onto the web skin, wherein the inner flange is in contact with the web skin. In one or more embodiments, web skin may include a carbon fiber material. In one or more embodiments, web skin may include a dry carbon fiber sheet. In one or more embodiments, web skin may include a preform. In one or more embodiments, web skin may include a carbon fiber material prior to a molding process such as a molding process as described in reference to FIGS. 5-6. This may be implemented with reference to FIGS. 1-12 and without limitation.

With continued reference to FIG. 12, at step 1220, method 1200 includes filling the mold cavity with a structural foam, wherein the structural foam is situated on top of the inner flange. In one or more embodiments, the structural foam is configured to provide a shape for at least the web skin. In one or more embodiments, structural foam may be configured to prevent movement of web skin within mold cavity. In one or more embodiments, filling the component mold cavity with a structural foam includes adhering the structural foam to the web skin. In one or more embodiments, filling the component mold cavity includes encapsulating the inner flange between the web skin and the structural foam. In one or more embodiments, inner flange and structural form predominantly takes the form of the mold cavity. In one or more embodiments, inner flange and structural form substantially takes the form of the mold cavity wherein inner flange and structural foam may take the form of a component having the same surface area shape as the surface area shape of the mold cavity. In one or more embodiments, inner flange and structural form substantially takes the form of the mold cavity wherein an outer surface of a combination of structural foam and inner flange may contain the same outlined shape as the outer surface of mold cavity. This may be implemented with reference to FIGS. 1-12 and without limitation.

With continued reference to FIG. 12, at step 1225, method 1200 includes placing the outer flange within the component mold and on top of the structural foam, wherein the outer flange and the web skin encapsulate the inner flange and the structural foam. This may be implemented with reference to FIGS. 1-12 and without limitation. In one or more embodiments, method 1200 includes a molding process such as any molding process as described in this disclosure. In one or more embodiments, method 1200 further includes introducing a resin into the component mold and infusing the carbon fiber material with the resin. This may be implemented with reference to FIGS. 1-12 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
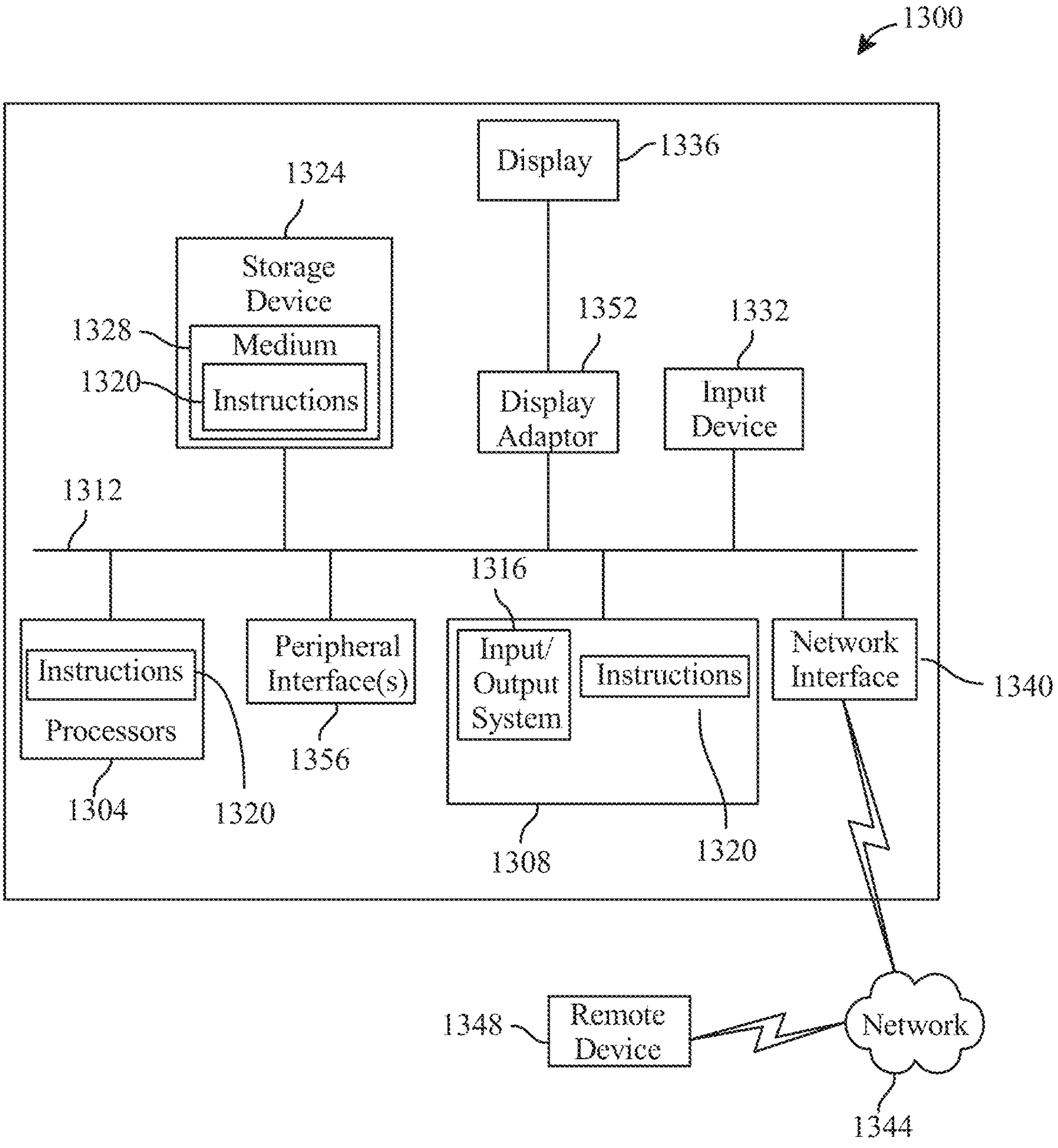
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft component comprising:

a core filler having a predetermined shape;

an outer flange located near a first end of the core filler;

an inner flange located near a second end of the core filler;

a web skin encapsulating the inner flange and at least a portion of the core filler, wherein the core filler is affixed to the web skin and configured to provide a separation between the outer flange and the inner flange, and wherein the aircraft component comprises a portion of an aircraft.

2. The aircraft component of claim 1, wherein the core filler comprises a structural foam.

3. The aircraft component of claim 2, wherein:

the web skin comprises a carbon fiber material; and the structural foam comprises a closed cell foam and wherein the closed cell foam is impermeable to a resin of the carbon fiber material.

4. The aircraft component of claim 1, wherein the core filler comprises thermal insulating properties.

5. The aircraft component of claim 1, wherein the core filler is adhered to the web skin.

6. The aircraft component of claim 1, wherein the core filler is configured to prevent buckling of the web skin under a load.

7. The aircraft component of claim 1, wherein the aircraft comprises a blended wing body aircraft (BWB), the BWB having no demarcation between a wing and a main body of the BWB.

8. The aircraft component of claim 1, wherein the aircraft component is included within an aircraft structure, the aircraft structure comprising a plurality of aircraft components.

9. The aircraft component of claim 8, wherein the plurality of aircraft components are situated parallel relative to each other.

10. A method of manufacture for an aircraft component, the method comprising:

receiving a component mold having a mold cavity, wherein the mold cavity comprises:

a web skin blanketing a surface of the mold cavity;

an inner flange located and in contact with the web skin; and a core filler is situated on top of the inner flange; and placing an outer flange within the component mold and on top of the core filler, wherein the outer flange and the web skin encapsulate the inner flange and the core filler, and wherein the core filler is configured to provide a separation between the outer flange and the inner flange.

11. The method of claim 10, wherein the core filler comprises a structural foam.

12. The method of claim 11, wherein:

the web skin comprises a carbon fiber material; and the structural foam comprises a closed cell foam and wherein the closed cell foam is impermeable to a resin of the carbon fiber material.

13. The method of claim 10, wherein the core filler comprises thermal insulating properties.

14. The method of claim 10, wherein the core filler is adhered to the web skin.

15. The method of claim 10, wherein the core filler is configured to prevent buckling of the web skin under a load.

16. The method of claim 10, wherein the aircraft component comprises a portion of a blended wing body aircraft (BWB), the BWB having no demarcation between a wing and a main body of the BWB.

17. The method of claim 10, wherein the aircraft component is included within an aircraft structure, the aircraft structure comprising a plurality of aircraft components.

18. The method of claim 17, wherein the plurality of aircraft components are situated parallel relative to each other.

* * * * *